United States Patent [19]
Yakou

[11] Patent Number: 5,150,937
[45] Date of Patent: Sep. 29, 1992

[54] WORK PICKUP APPARATUS

[75] Inventor: Takeshi Yakou, Tokyo, Japan

[73] Assignee: Canon Kabushiki Kaisha, Tokyo, Japan

[21] Appl. No.: 578,344

[22] Filed: Sep. 6, 1990

[30] Foreign Application Priority Data

Sep. 7, 1989 [JP] Japan .................................. 1-230412
Sep. 3, 1990 [JP] Japan .................................. 2-230604

[51] Int. Cl.$^5$ ............................................. B25J 15/10
[52] U.S. Cl. .................................. 294/119.1; 294/907; 901/38; 901/39
[58] Field of Search ...................... 294/119.1, 106, 93, 294/81.2, 81.54, 81.62, 67.33, 88, 67.5, 81.52, 907; 901/36, 37, 38, 39; 279/110, 117, 1 L, 1 H, 33

[56] References Cited

U.S. PATENT DOCUMENTS

| | | | |
|---|---|---|---|
| 391,533 | 10/1888 | Howard | 279/33 |
| 1,565,733 | 12/1925 | Godfriaux | 279/1 H |
| 2,625,424 | 1/1953 | Hyman | 294/81.62 X |
| 2,642,307 | 6/1953 | Olson | 294/67.33 |
| 3,330,590 | 7/1967 | Sheridan et al. | 294/88 X |
| 3,460,329 | 8/1969 | Overstreet, Jr. | 294/88 X |
| 3,610,644 | 10/1971 | Swanson et al. | 279/110 X |
| 3,866,966 | 2/1975 | Skinner, II | 294/106 |
| 3,901,547 | 8/1975 | Skinner, II | 294/106 X |
| 4,351,553 | 9/1982 | Rovetta et al. | 294/106 |
| 4,957,320 | 9/1990 | Ulrich | 294/106 |

FOREIGN PATENT DOCUMENTS 63136846 9/1968 Japan .
64-3610 1/1989 Japan .

Primary Examiner—Johnny D. Cherry
Attorney, Agent, or Firm—Fitzpatrick, Cella, Harper & Scinto

[57] ABSTRACT

A work pickup apparatus is provided with a pickup main body, at least three pickup segments radially movable from substantially a center of the pickup main body, and a driving motor for driving the pickup segments in a synchronous state to pick up a workpiece.

11 Claims, 20 Drawing Sheets

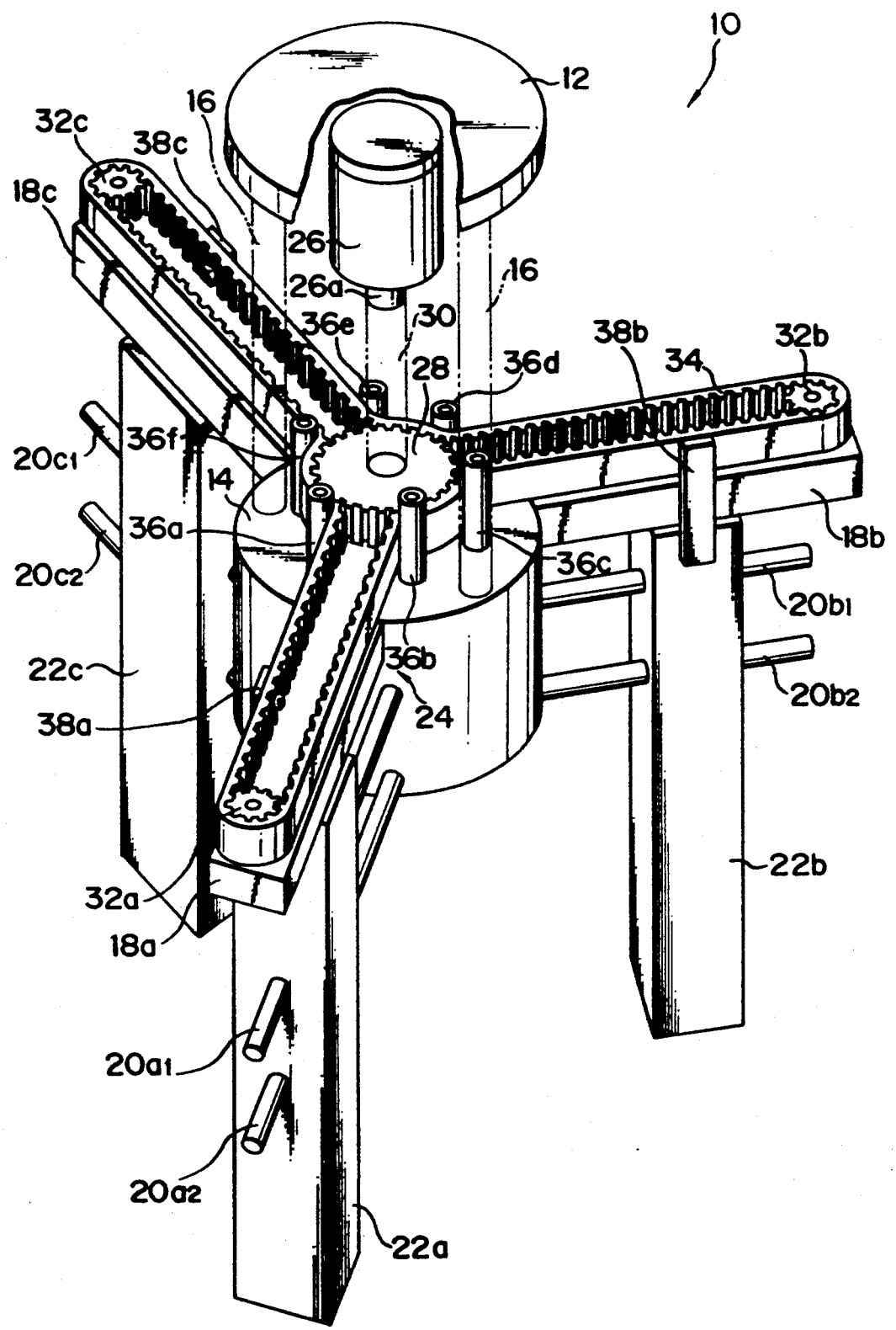
F I G. 4

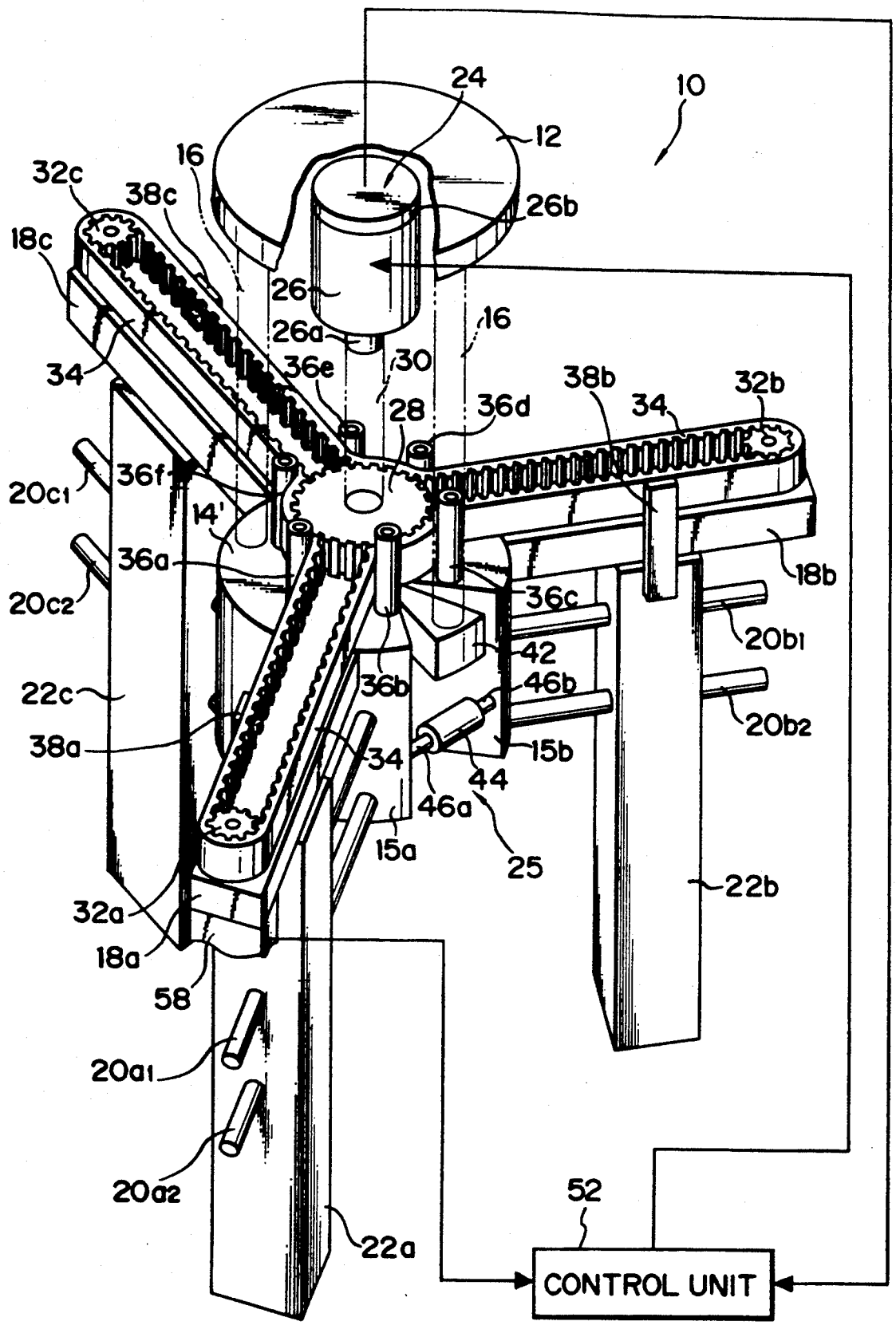
F I G. 6

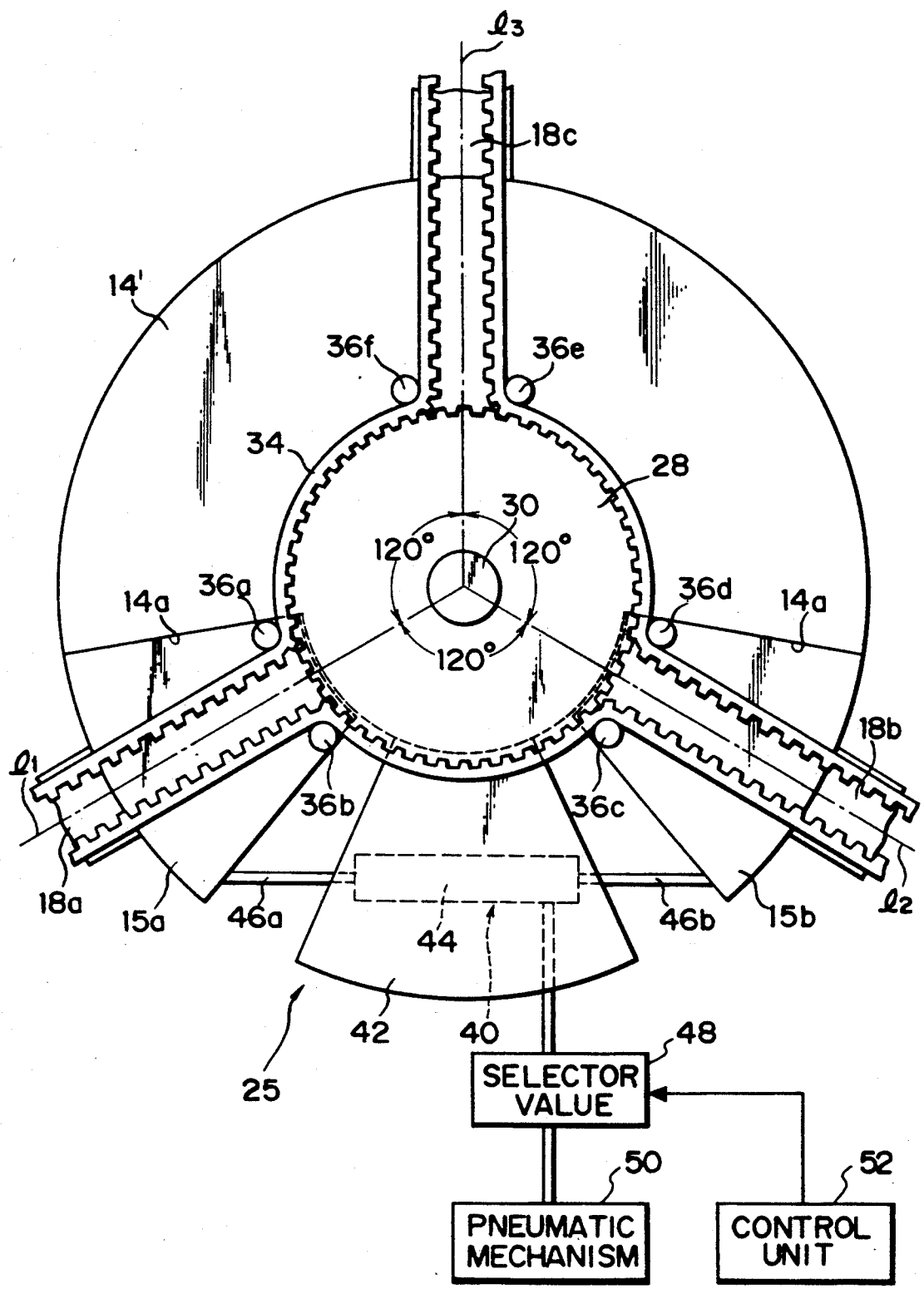
F I G. 7

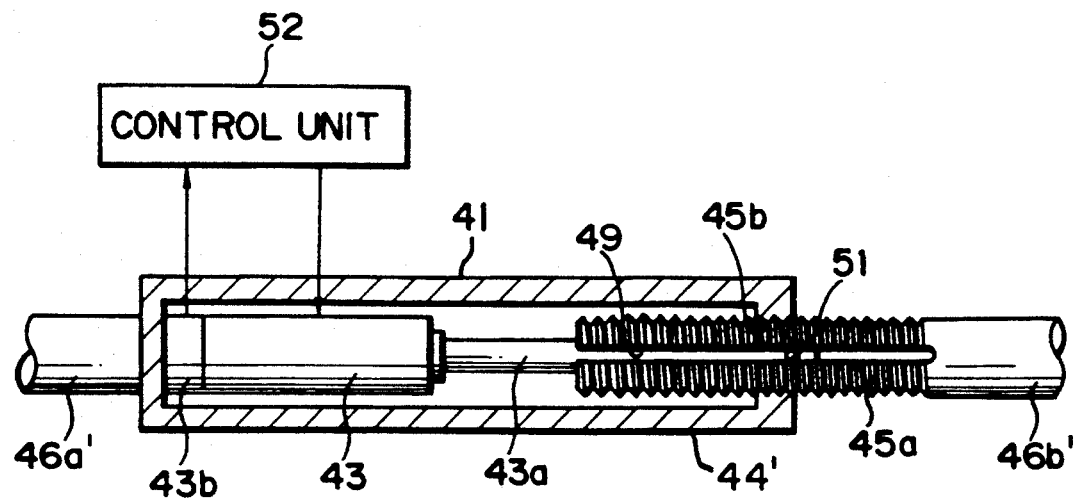
F I G. 12A
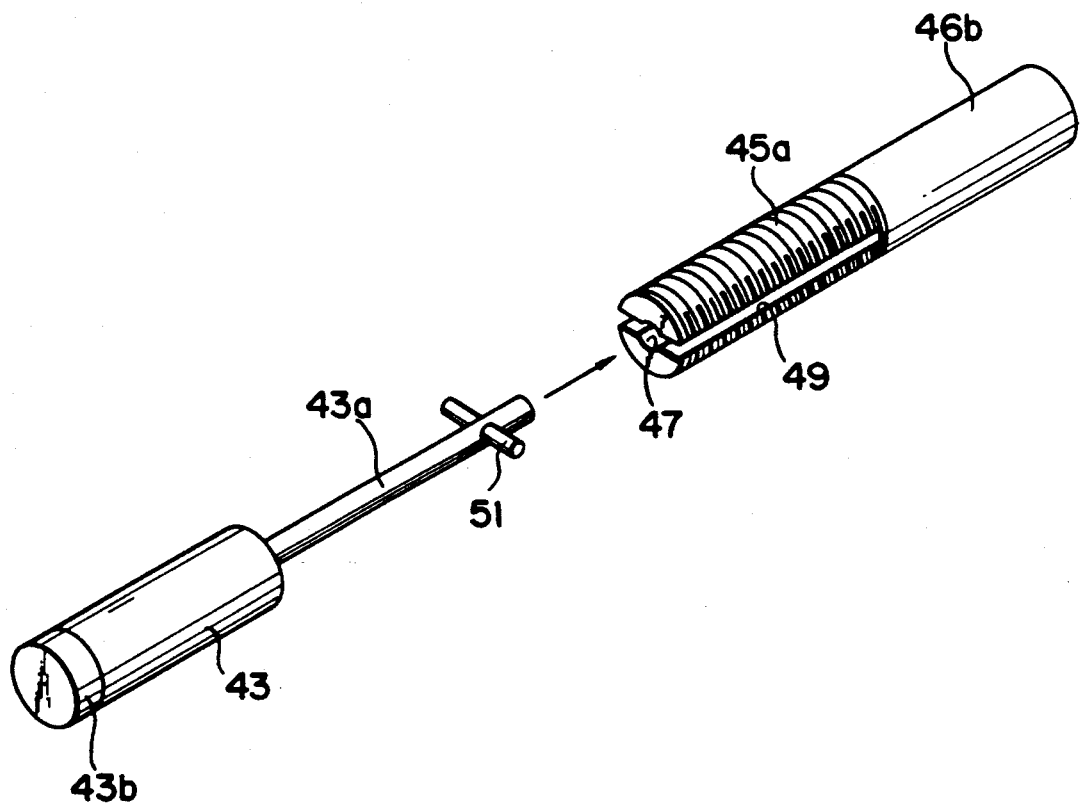
F I G. 12B

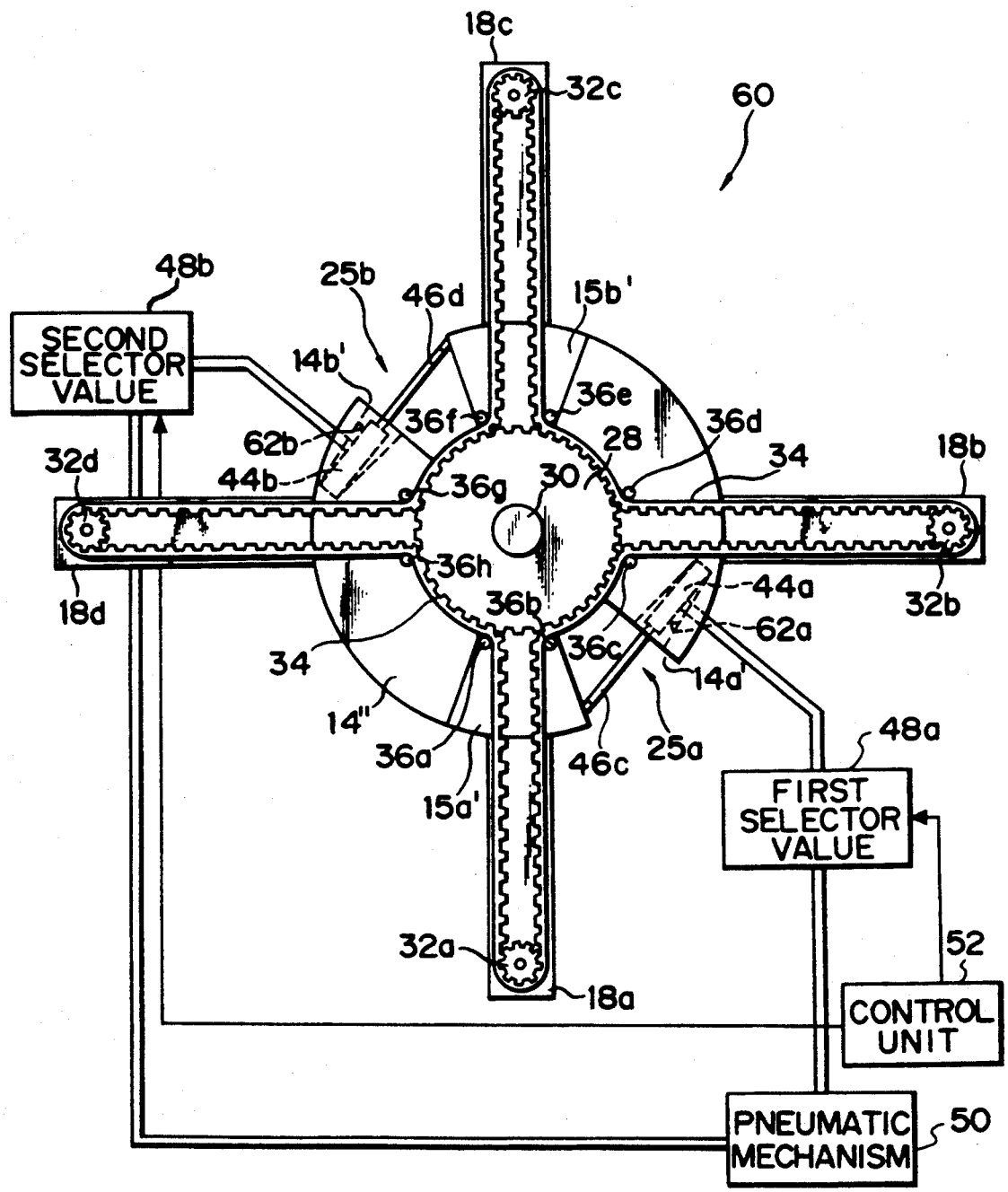
F I G. 13

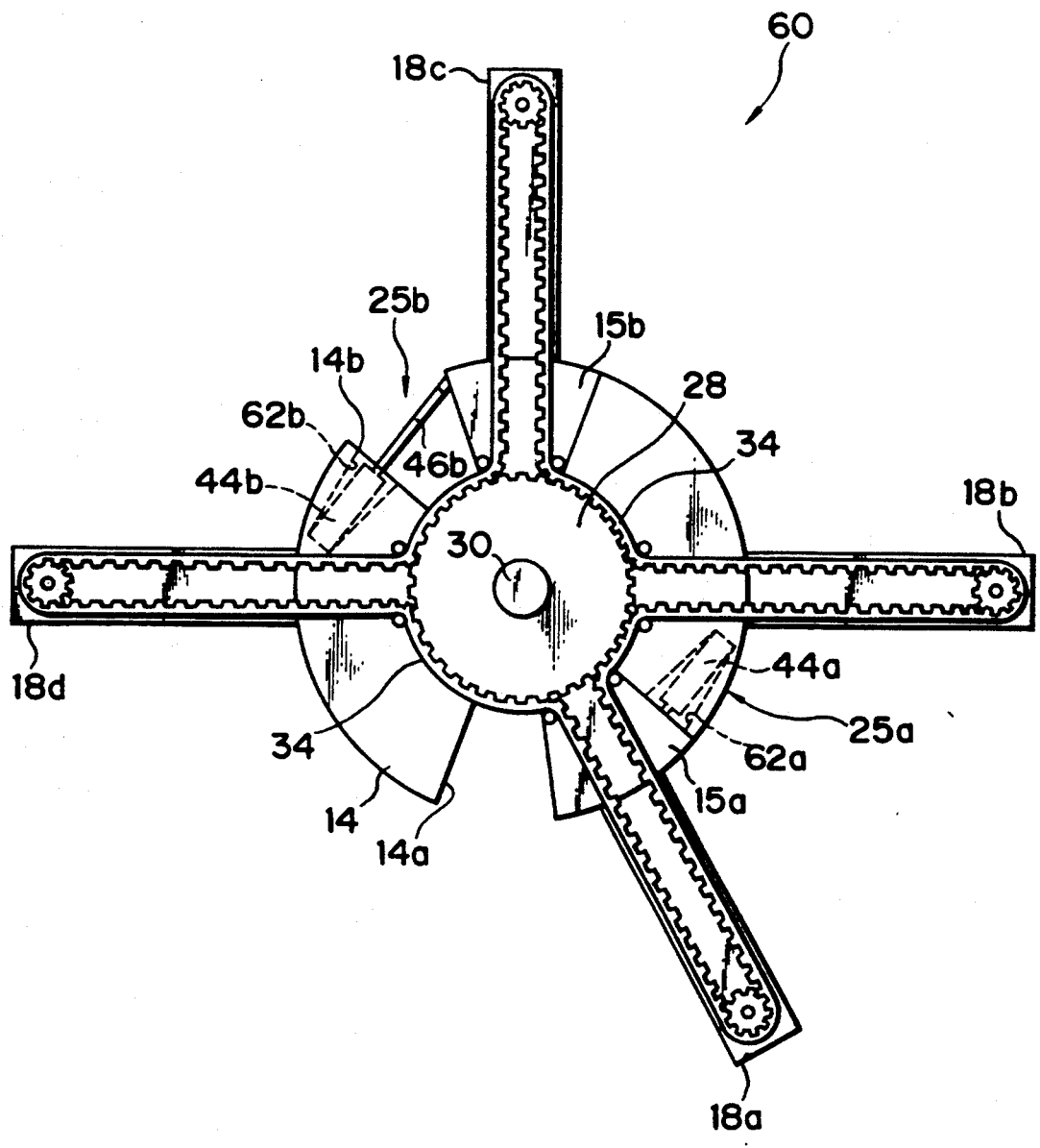
F I G. 14A

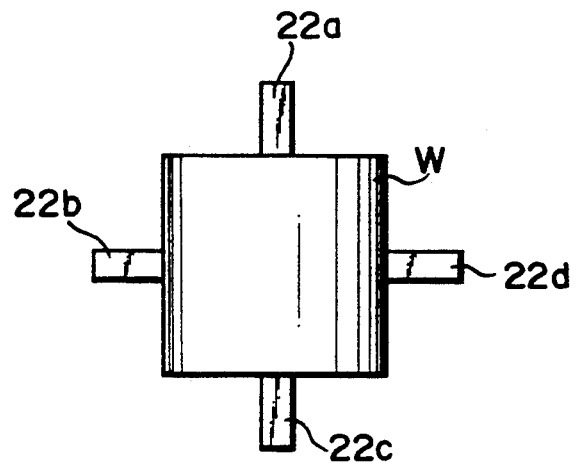
F I G. 15A
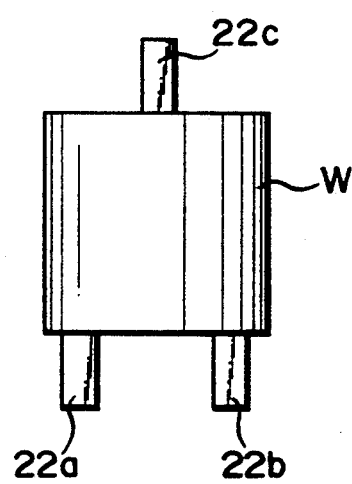
F I G. 15B

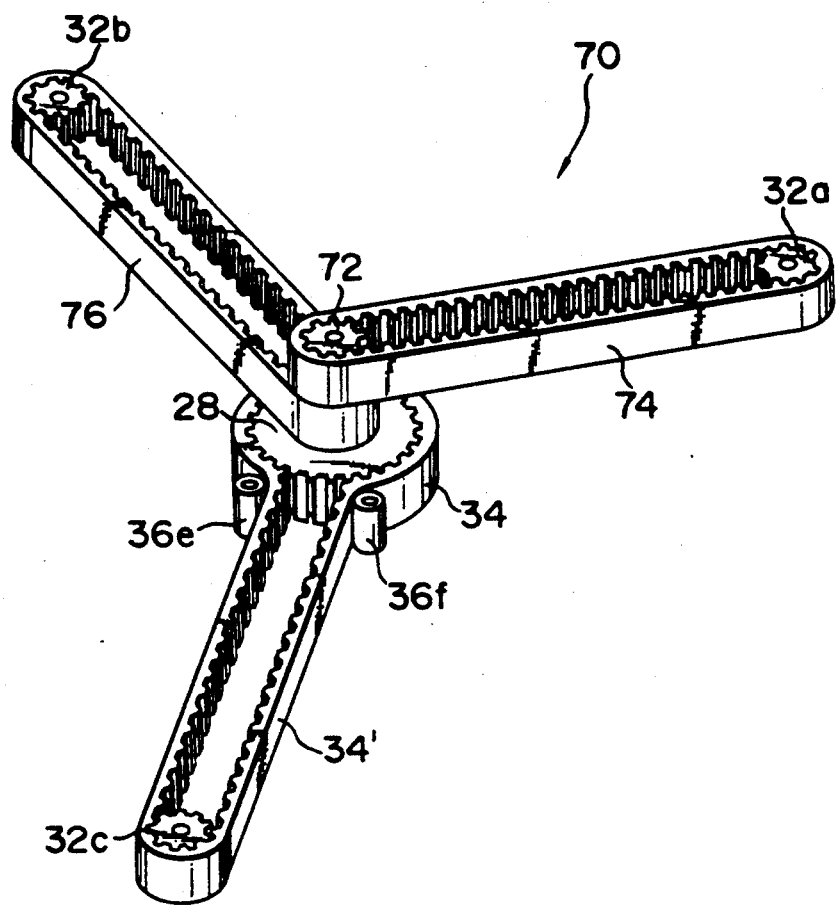
F I G. 16

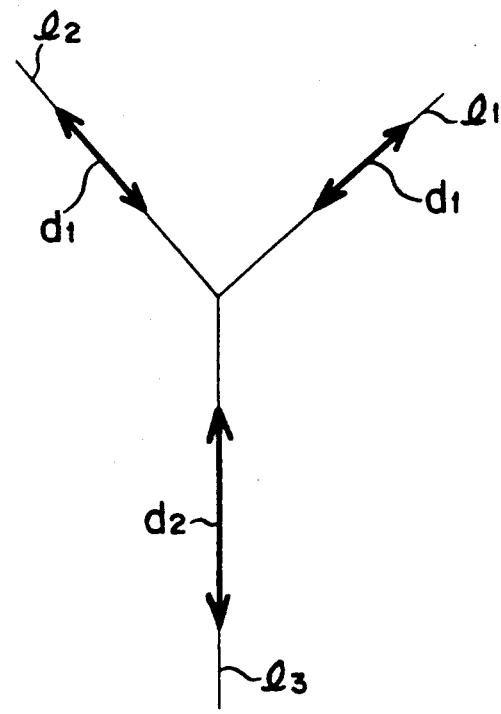
F I G. 17
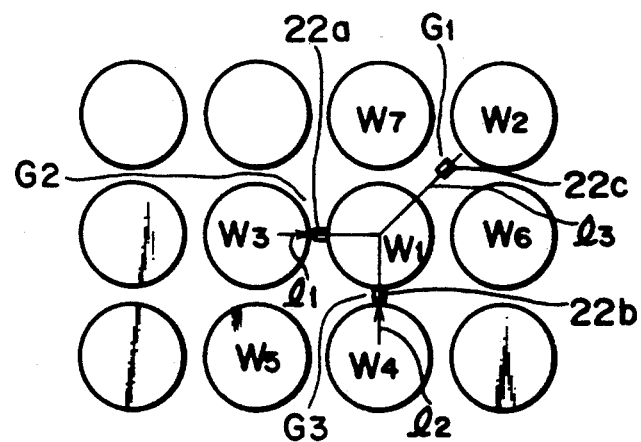
F I G. 18

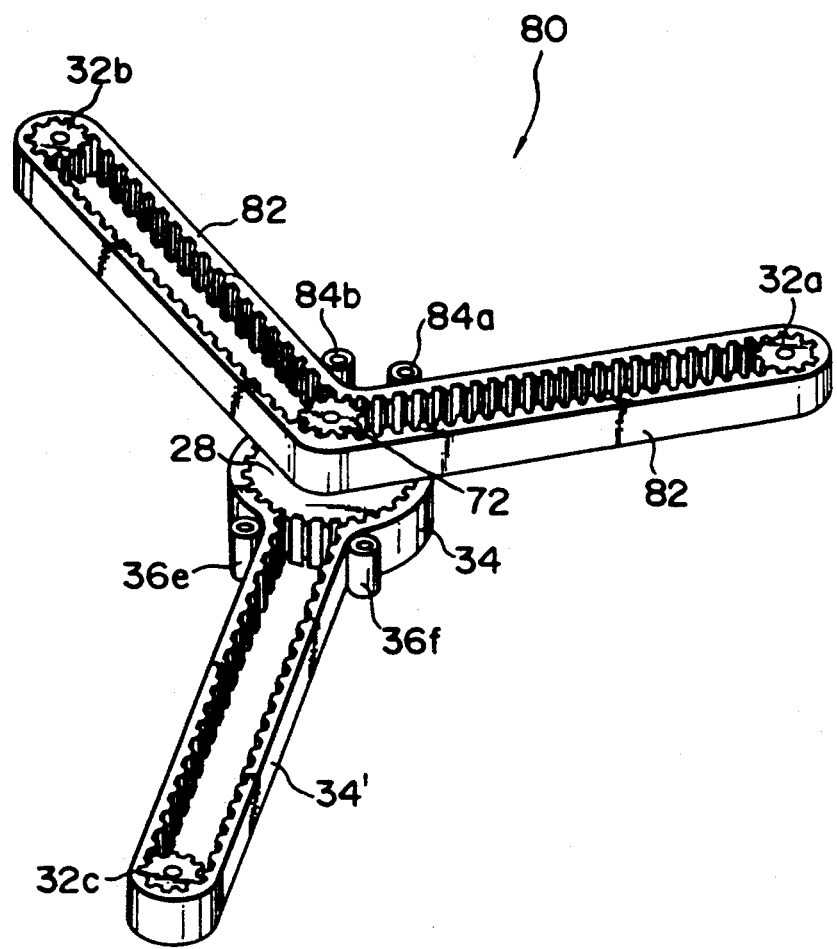
F I G. 19

WORK PICKUP APPARATUS

BACKGROUND OF THE INVENTION

The present invention relates to a work pickup apparatus in, e.g., a robot and, more particularly, to a work pickup apparatus for picking up a work using a plurality of parallel pickup pawls.

As a conventional work pickup apparatus, an apparatus in which chuck teeth are meshed with a groove worked in a spiral shape like in a chuck device such as a lathe is known.

In Japanese Patent Publication No. 64-3610 or Japanese Utility Model Laid-Open No. 63-136846, radial guide grooves b are formed in a disk-like member a, and pickup pawls d are engaged with a cam plate c, as shown in FIG. 1 as a prior art.

However, since these prior art devices employ the spiral plate and the cam plate, respectively, they suffer from the following drawbacks. That is, 1. The spiral plate and the cam plate are difficult to design.
2. The spiral plate and the cam plate are difficult to manufacture and expensive.
3. The spiral plate and the cam plate have large weights.
4. When a stroke of each pickup pawl is increased, the sizes of the spiral plate and the cam plate are increased accordingly, resulting in an increase in weight.

More specifically, radial moving paths $l_1$, $l_2$, and $l_3$ of three finger members $d_1$, $d_2$, and $d_3$ are set to be separated from each other at a separation angle of 120 degrees with respect to the center of the disk-like member a. For this reason, for example, a work having a triangular shape or non-parallel surfaces contacting finger members cannot be reliably picked up. When a large number of works f stored in a pallet e are to be picked up, a gap $g_1$ between a work $f_1$ to be picked up and an obliquely right upward adjacent work $f_2$ in FIG. 2 has a sufficient margin. However, gaps $g_2$ and $g_3$ between the work $f_1$ and its left and downward adjacent works $f_3$ and $f_4$ are small.

As a result, since the separation angle of the moving paths $l_1$, $l_2$, and $l_3$ of the three finger members $d_1$, $d_2$, and $d_3$ is fixed to a constant angle of 120 degrees, one finger member $d_1$ can be inserted in the relatively large gap $g_1$, but the remaining two fingers $d_2$ and $d_3$ cannot be respectively inserted in the small gaps $g_2$ and $g_3$. In this manner, it is impossible for the three finger members $d_1$, $d_2$, and $d_3$ to pick up the work $f_1$, thus posing a problem.

In the conventional pickup apparatus shown in FIG. 1, the finger members $d_1$, $d_2$, and $d_3$ have the same synchronous moving strokes. In the state of the work $f_1$ shown in FIG. 2, even if the finger members $d_2$ and $d_3$ can be inserted in the small gaps $g_2$ and $g_3$, since the finger members $d_1$, $d_2$, and $d_3$ have the same long moving strokes, the work $f_1$ to be picked up is pushed in an obliquely right upward direction in FIG. 2, and pushes out right and upward adjacent works $f_5$ and $f_6$ (FIG. 3A) from their positions. In this manner, the placing positions of the works $f_5$ and $f_6$ in the pallet e are shifted, and the pickup operations of these works $f_5$ and $f_6$ are disabled.

When the works $f_5$ and $f_6$ are placed to be inserted on the bottom surface of the pallet e, a movement of these works along a horizontal surface is inhibited. For this reason, when the work $f_1$ is pushed in an obliquely right upward direction upon its pickup operation in such a placing state, its movement is blocked by the works $f_5$ and $f_6$, as shown in FIG. 3B. As a result, the work $f_1$ cannot be picked up.

SUMMARY OF THE INVENTION

The present invention has been made in consideration of the above situation, and has as its object to provide a lightweight, inexpensive work pickup apparatus which can be easily designed and manufactured.

It is another object to provide a work pickup apparatus which can reliably pick up a work having a triangular shape or non-parallel surfaces contacting finger members.

It is still another object of the present invention to provide a work pickup apparatus which can reliably pick up a work even if the work is placed in a pallet in any state.

It is still another object of the present invention to provide a work pickup apparatus which can reliably pick up a work placed in a pallet without adversely influencing the placing states of other works.

In order to achieve the above objects, according to the present invention, there is provided a work pickup apparatus which comprises: a pickup main body; at least three pickup segments radially movable from substantially a center of the pickup main body; and driving means for synchronously driving the pickup segments in a synchronous state to pick up a work.

There is also provided a work pickup apparatus according to the present invention, which comprises: a pickup main body integrally having at least two arm portions extending from a central portion thereof along a radial direction; at least two pickup segments supported to be reciprocal along extending directions of the corresponding arm portions from the central portion of the pickup main body; a driving motor; a driving rotary member rotated by the driving motor; driven rotary members pivotally supported on distal ends of the arm portions; an endless belt radially looped between the driving rotary member and the driven rotary members; and coupling members for coupling radial portions of the endless belt and the pickup segments.

Since the work pickup apparatus of the present invention is arranged as described above, it can pick up a work by a plurality of pickup pawls by using a single belt and a plurality of pulleys that are easy to design and manufacture.

There is further provided a work pickup apparatus according to the present invention, which comprises: a hand main body; at least three arm members extending from substantially a center of the hand main body along a radial direction; angle changing means for changing an angle defined between at least a pair of adjacent arm members; finger members disposed in units of arm members, supported to be movable along the radial direction, and being able to be in contact with a work to be picked up; and driving means for driving to change radial positions of the finger members on the corresponding arm members.

Since the work pickup apparatus according to the present invention is arranged as described above, disposition angles of at least three finger members can be set at optimal angles for picking up a work, and a work having any shape can be reliably picked up. In addition, even if a work is stored in a pallet in any state, it can be reliably picked up.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is a schematic perspective view showing an arrangement of a work pickup apparatus according to the first embodiment of the present invention;

FIG. 6 is a schematic perspective view showing an arrangement of a work pickup apparatus according to the second embodiment of the present invention;

FIG. 7 is a plan view showing a state wherein first and second arm members are separated from each other at a separation angle of 120 degrees;

FIGS. 12A and 12B are respectively a perspective view and an exploded perspective view showing an arrangement of a modification of an angle changing mechanism of the pickup apparatus according to the second embodiment;

FIG. 13 is a schematic perspective view showing an arrangement of a work pickup apparatus according to the third embodiment of the present invention;

FIGS. 14A and 14B are plan views showing first and second angle changing modes;

FIGS. 15A and 15B are plan views showing a state wherein four and three finger members pick up a work, respectively;

FIG. 16 is a perspective view showing only a main part of an arrangement of a pickup apparatus according to the fourth embodiment of the present invention;

FIG. 17 is a view for explaining moving strokes of three finger members in the fourth embodiment;

FIG. 18 is a schematic plan view showing a state wherein the pickup apparatus of the fourth embodiment picks up a work W in a pallet; and FIG. 19 is a perspective view showing only a main part of an arrangement of a pickup apparatus according to the fifth embodiment of the present invention.

DETAILED DESCRIPTION OF THE PREFERRED EMBODIMENTS

Figure 1:
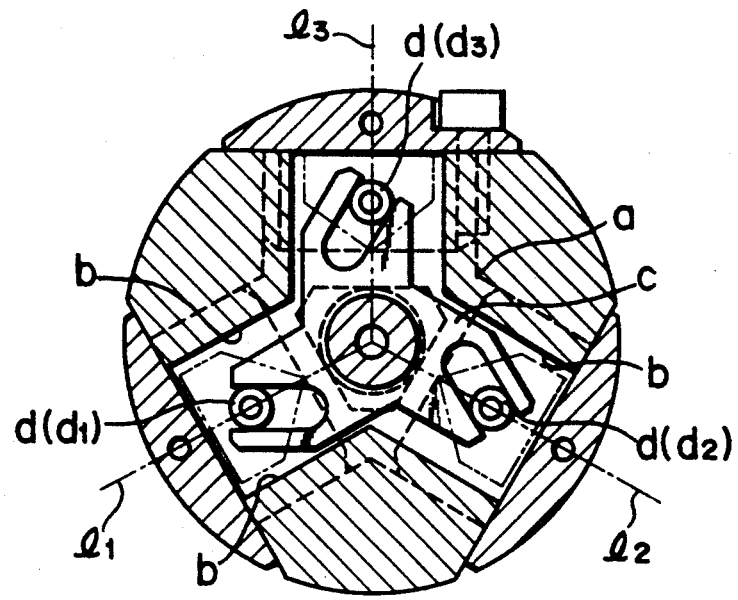
FIG. 1 is a sectional plan view showing an arrangement of a conventional pickup apparatus.
Figure 2:
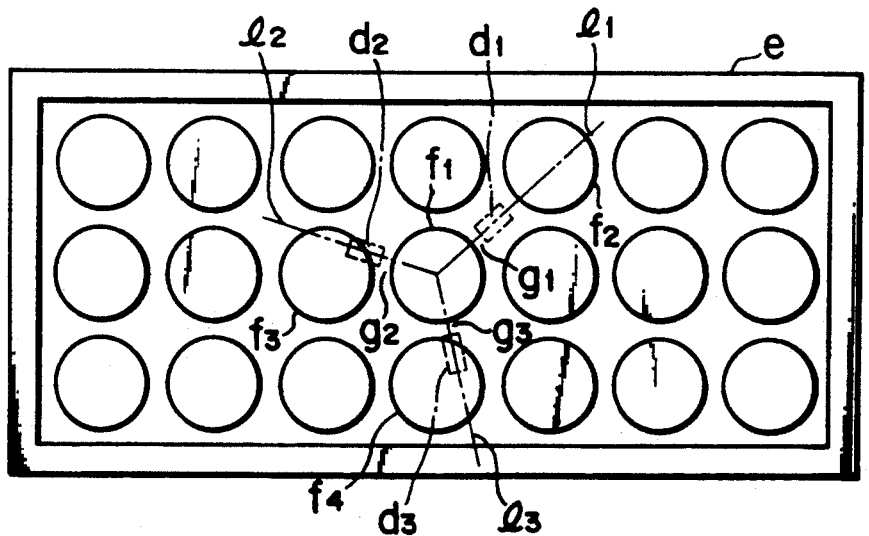
FIG. 2 is a plan view for explaining a first problem posed when works aligned in a pallet are to be picked up by a conventional pickup apparatus in which disposition angles of finger members are fixed.
Figure 3A:
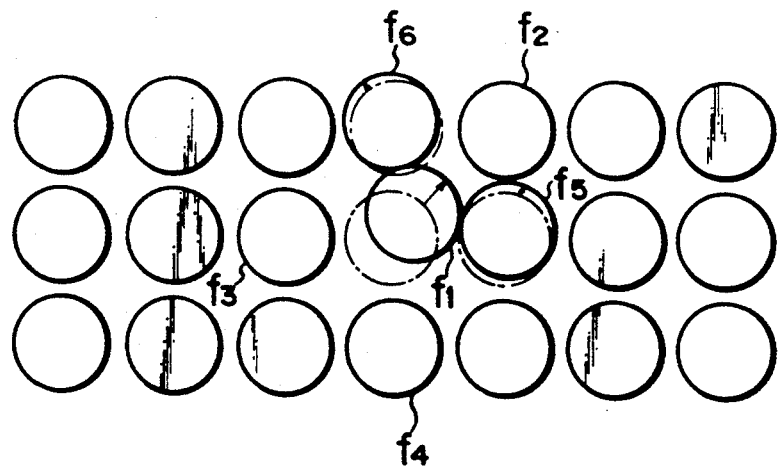
FIGS. 3A and 3B are views for explaining a second problem posed when works aligned in a pallet are to be picked up by a conventional pickup apparatus in which moving speeds of finger members are kept constant.
Figure 3B:
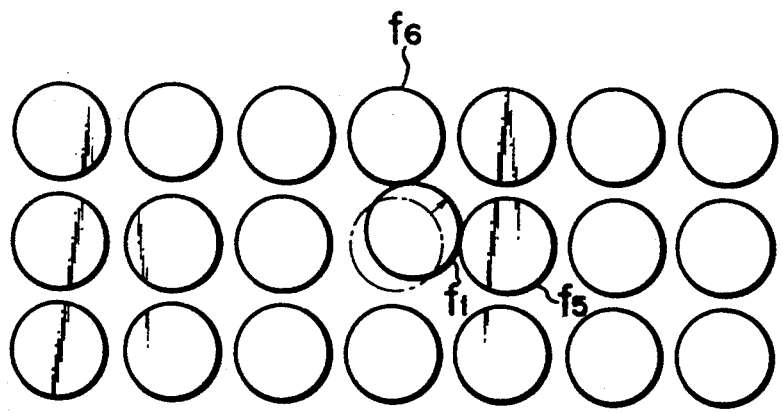

An arrangement of a work pickup apparatus according to the first embodiment of the present invention will now be described with reference to FIGS. 4 and 5.

FIG. 4 shows a schematic arrangement of a pickup apparatus 10 according to the first embodiment. The pickup apparatus 10 is attached to the lower end of an arm of a robot (not shown) via a coupling plate 12 to pick up a predetermined work.

More specifically, the pickup apparatus 10 comprises a cylindrical pickup main body 14 at its central portion. The pickup main body 14 is connected immediately below the above-mentioned coupling plate 12 via a plurality of coupling rods 16 to be separated by a predetermined distance from the coupling plate 12. Three arm portions 18a, 18b, and 18c which extend radially outwardly are integrally formed on the upper end of the pickup main body 14 at equal angular intervals, i.e., at 120-degree angular intervals in the circumferential direction.

Three pairs of upper and lower guide rods $20a_1$ and $20a_2$, $20b_1$ and $20b_2$, and $20c_1$ and $20c_2$, which are located immediately below the three arm portions 18a, 18b, and 18c and extend radially outwardly, are integrally connected to the lower portion of the pickup main body 14. Pickup pawls 22a, 22b, and 22c are slidably supported on the three pairs of upper and lower guide rods $20a_1$ and $20a_2$, $20b_1$ and $20b_2$, and $20c_1$ and $20c_2$, respectively. More specifically, the three pickup pawls 22a, 22b, and 22c are supported below the corresponding arm portions 18a, 18b, and 18c to be reciprocated along their extending directions.

The pickup apparatus 10 comprises a driving mechanism 24 for integrally and radially reciprocating these three pickup pawls 22a, 22b, and 22c in a synchronous state.

The driving mechanism 24 comprises a driving motor 26 fixed on the lower surface of the above-mentioned coupling plate 12. A large-diameter driving spur gear 28 is axially supported on the upper surface of the above-mentioned pickup main body 14 to be rotatable about an axis of rotation matching with the driving axis of the driving motor 26. A driving shaft 26a of the driving motor 26 is coupled to the spur gear 28 via a coupling shaft 30. The spur gear 28 is rotated by the driving motor 26.

Small-diameter driven spur gears 32a, 32b, and 32c are axially supported at the distal end portions of the arm portions 18a, 18b, and 18c, respectively, to be rotatable about vertical axes. In order to couple these three driven spur gears 32a, 32b, and 32c to the driving spur gear 28, an endless toothed timing belt 34 is arranged with its teeth facing inward.

Figure 5:
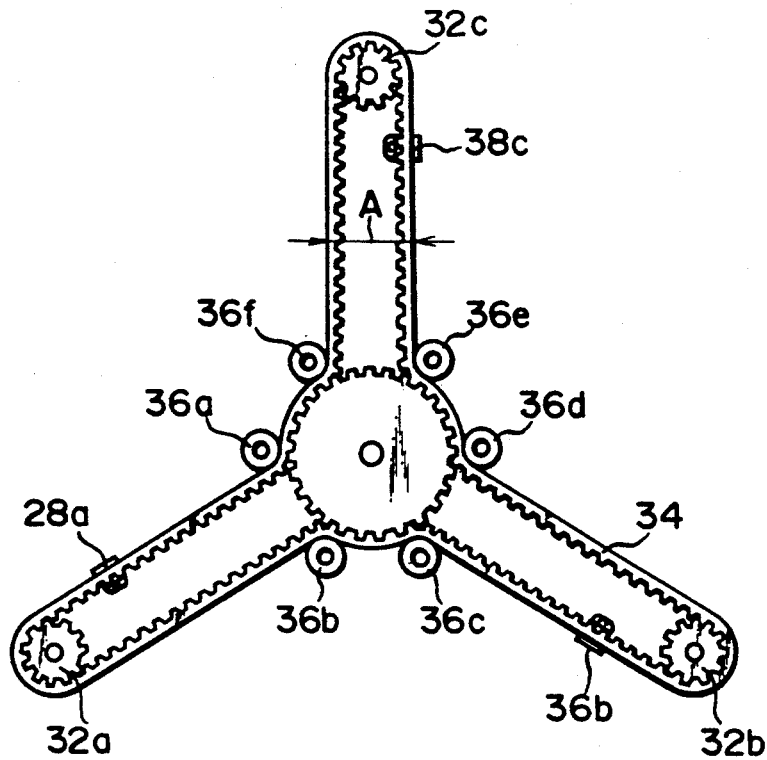
FIG. 5 is a plan view of the pickup apparatus shown in FIG. 4.

In order to maintain a radially extending state in three directions of the timing belt 34, as shown in FIG. 5, six regulation rollers 36a, 36b, 36c, 36d, 36e, and 36f stand upright on and are rotatably and axially supported on the upper surface of the pickup main body 14. More specifically, with these six regulation rollers 36a, 36b, 36c, 36d, 36e, and 36f, the timing belt 34 cannot be meshed with three portions of the outer peripheral surface of the spur gear 28 which portions correspond to proximal end portions of the three arm portions 18a, 18b, and 18c, but can be meshed with the spur gear 28 on the outer peripheral surface portions other than these three portions. In addition, the timing belt 34 can be meshed with outward portions of the outer peripheral surfaces of the three driven spur gears 32a, 32b, and 32c.

The pairs of regulation rollers 36a and 36b, 36c and 36d, and 36e and 36f corresponding to the driven spur gears 32a, 32b, and 32c are aligned at positions so that the radial portions of the timing belt 34 have a constant separation width A, as shown in FIG. 5.

In this manner, after this timing belt 34 is meshed with a portion of the outer peripheral surface of the driving spur gear 28, it is meshed with the outward portion of the outer peripheral surface of the first driven spur gear 32a. After the timing belt 34 is meshed with another portion of the outer peripheral surface of the driving spur gear 28, it is meshed with the outward portion of the outer peripheral surface of the second driven spur gear 32b. Then, after the timing belt 34 is meshed with still another portion of the outer peripheral surface of the driving spur gear 28, it is meshed with the outward portion of the outer peripheral surface of the third driven spur gear 32c. In this manner, the timing belt 34 is looped endlessly.

In order to couple a portion of the timing belt 34, which extends radially outwardly along the first arm portion 18a to the first pickup pawl 22a, a first coupling member 38a is formed to be bridged over these two parts. The upper and lower ends of the first coupling member 38a are fixed to the timing belt 34 and the first pickup pawl 22a, respectively. Similarly, the second and third pickup pawls 22b and 22c are coupled to the timing belt 34 via second and third coupling members 38b and 38c.

These pickup pawls 22a, 22b, and 22c are held at positions separated from the central portion by the same radius while they are coupled to the timing belt 34 via the corresponding coupling members 38a, 38b, and 38c.

Since the driving mechanism 24 is arranged as described above, when the driving motor 26 is started, the driving spur gear 28 is rotated, and the rotational force of the spur gear 28 is equally transmitted to the three pickup pawls 22a, 22b, and 22c via the timing belt 34. As a result, the three pickup pawls 22a, 22b, and 22c are reciprocally moved in the radial direction to be synchronized with each other.

In this manner, according to the pickup apparatus 10 of the first embodiment, even when columnar objects having different diameters as works are to be sequentially picked up, they can be picked up without changing their centers.

The present invention is not limited to the arrangement of the first embodiment described above, and various changes and modifications may be made within the spirit and scope of the invention.

Arrangements of various other embodiments of a pickup apparatus according to the present invention will be described in detail below. The same reference numerals denote the same parts as in the first embodiment throughout the following descriptions.

The arrangement of a work pickup apparatus according to the second embodiment of the present invention will be described in detail below with reference to FIGS. 6 to 11.

FIG. 6 shows a schematic arrangement of a pickup apparatus 10 according to the second embodiment. The pickup apparatus 10 is attached to the lower end of an arm of a robot (not shown) via a coupling plate 12 to pick up a predetermined work. More specifically, the pickup apparatus 10 comprises a substantially cylindrical pickup main body 14' at its central portion. The pickup main body 14' is connected immediately below the above-mentioned coupling plate 12 via a plurality of coupling rods 16 to be separated by a predetermined distance from the coupling plate 12.

As shown in FIG. 7, a recess portion 14a is formed in the outer peripheral surface of the pickup main body 14' within an extending range of only 160 degrees along the circumferential direction. First and second slide blocks 15a and 15b are independently mounted in the recess portion 14a to be swingable along the circumferential direction. The outer peripheral surfaces of the first and second slide blocks 15a and 15b constitute circumferential surfaces having the same radius as that of the outer peripheral surface of the pickup main body 14'.

First and second arm portions 18a and 18b which extend radially outwardly are integrally attached to the upper ends of the central portions of the outer peripheral surfaces of these first and second slid blocks 15a and 15b. These first and second slide blocks 15a and 15b are respectively formed into a substantially fan-like shape having a central angle of 40 degrees with respect to the center of the pickup main body 14'. A third arm portion 18c which extends radially outwardly is integrally attached to the upper end at the central portion of the outer peripheral surface of the pickup main body 14'.

In the second embodiment, in a state wherein the first and second slide blocks 15a and 15b are brought into contact with the two side surfaces of the recess portion 14a, i.e., are most separated from each other, as shown in FIG. 7, an angle defined between central lines $l_1$ and $l_2$ as extending axes of the first and second arm portions 18a and 18b, i.e., a separation angle between the first and second arm portions 18a and 18b, is set to be 120 degrees (=160−40/2−40/2). When the angle is set in this manner, a range remaining as a space in the recess portion 14a corresponds to 80 degrees (=160−40−40).

As described above, since the third arm portion 18c is located just at the center of the first and second arm portions 18a and 18b, an angle defined between central lines $l_1$ and $l_3$ as the extending axes of the first and third arm portions 18a and 18c, i.e., a separation angle between the first and third arm portions 18a and 18c, and an angle defined between the central lines $l_2$ and $l_3$ as the extending axes of the second and third arm portions 18b and 18c, i.e., a separation angle between the second and third arm portions 18b and 18c, are respectively set to be 120 degrees. More specifically, in a state illustrated in FIG. 7, the first to third arm portions 18a, 18b, and 18c are separated at equal angular intervals, i.e., 120 degrees.

Two pairs of upper and lower guide rods $20a_1$ and $20a_2$ and $20b_1$ and $20b_2$ which extend radially outwardly are integrally connected to the lower portions of the first and second slide blocks 15a and 15b to be located below the central portions of the outer peripheral surfaces of the first and second arm portions 18a and 18b, respectively.

A pair of upper and lower guide rods $20c_1$ and $20c_2$ which extend radially outwardly are integrally connected to the lower portion of the central portion of the outer peripheral surface of the pickup main body 14 to be located below the third arm portion 18c described above. Three finger members 22a, 22b, and 22c are respectively slidably supported on the pairs of upper and lower guide rods $20a_1$ and $20a_2$, $20b_1$ and $20b_2$, and $20c_1$ and $20c_2$. More specifically, the three finger members 22a, 22b, and 22c are supported below the corresponding arm portions 18a, 18b, and 18c to be reciprocal along their extending directions.

Note that these finger members 22a, 22b, and 22c extend downward to be parallel to each other.

The pickup apparatus 10 comprises a driving mechanism 24 for integrally radially reciprocating these three finger members 22a, 22b, and 22c to be synchronized with each other, and an angle changing mechanism 25 for changing angles defined among the extending axes $l_1$, $l_2$, and $l_3$ of the three arm portions 18a, 18b, and 18c, as shown in FIG. 7.

The driving mechanism 24 comprises a driving motor 26 fixed on the lower surface of the above-mentioned coupling plate 12. A large-diameter driving spur gear 28 is axially supported on the upper surface of the above-mentioned pickup main body 14' to be rotatable about an axis of rotation matching with the driving axis of the driving motor 26. A driving shaft 26a of the driving motor 26 is coupled to the spur gear 28 via a coupling shaft 30. The spur gear 28 is rotated by the driving motor 26.

Small-diameter driven spur gears 32a, 32b, and 32c are axially supported at the distal end portions of the arm portions 18a, 18b, and 18c, respectively, to be rotatable about vertical axes. In order to couple these three driven spur gears 32a, 32b, and 32c to the driving spur gear 28, an endless toothed timing belt 34 is arranged with its teeth facing inward.

In order to maintain a radially extending state in three directions of the timing belt 34, as shown in FIG. 5, six regulation rollers 36a, 36b, 36c, 36d, 36e, and 36f stand upright on and are rotatably and axially supported on the upper surface of the pickup main body 14. More specifically, with these six regulation rollers 36a, 36b, 36c, 36d, 36e, and 36f, the timing belt 34 cannot be meshed with three portions of the outer peripheral surface of the spur gear 28 which portions correspond to proximal end portions of the three arm portions 18a, 18b, and 18c, but can be meshed with the spur gear 28 on the outer peripheral surface portions other than these three portions. In addition, the timing belt 34 can be meshed with outward portions of the outer peripheral surfaces of the three driven spur gears 32a, 32b, and 32c.

The pairs of regulation rollers 36a and 36b, 36c and 36d, and 36e and 36f corresponding to the driven spur gears 32a, 32b, and 32c are aligned at positions so that the radial portions of the timing belt 34 have a constant separation width A, as shown in FIG. 5.

In this manner, after this timing belt 34 is meshed with a portion of the outer peripheral surface of the driving spur gear 28, it is meshed with the outward portion of the outer peripheral surface of the first driven spur gear 32a. After the timing belt 34 is meshed with another portion of the outer peripheral surface of the driving spur gear 28, it is meshed with the outward portion of the outer peripheral surface of the second driven spur gear 32b. Then, after the timing belt 34 is meshed with still another portion of the outer peripheral surface of the driving spur gear 28, it is meshed with the outward portion of the outer peripheral surface of the third driven spur gear 32c. In this manner, the timing belt 34 is looped endlessly.

In order to couple a clockwise folded portion of the timing belt 34, which portion extends radially outwardly along the first arm portion 18a, to the first finger member 22a, a first coupling member 38a is formed to be bridged over these two parts. The upper and lower ends of the first coupling member 38a are coupled to the timing belt 34 and the first finger member 22a, respectively. Similarly, the second and third finger members 22b and 22c are coupled to the timing belt 34 via second and third coupling members 38b and 38c, respectively.

These finger members 22a, 22b, and 22c are held at positions separated from the central portion by the same radius while they are coupled to the timing belt 34 via the corresponding coupling members 38a, 38b, and 38c.

Since the driving mechanism 24 is arranged as described above, when the driving motor 26 is started, the driving spur gear 28 is rotated, and the rotational force of the spur gear 28 is equally transmitted to the three finger members 22a, 22b, and 22c via the timing belt 34. As a result, the three finger members 22a, 22b, and 22c are reciprocally moved in the radial direction to be synchronized with each other.

On the other hand, the above-mentioned angle changing mechanism 25 comprises a cylinder mechanism 40, arranged between the swingably supported first and second slide blocks 15a and 15b, for increasing-/decreasing a separation distance therebetween, and a stopper member 42, fixed to the upper portion of the central portion of the outer peripheral surface of the recess portion 14a of the pickup main body 14' described above, for, when the separation distance between the two slide blocks 15a and 15b is decreased by the cylinder mechanism 40, regulating a stop angle between the two slide blocks since the two slide blocks 15a and 15b are brought into contact with it from two sides.

Figure 8:
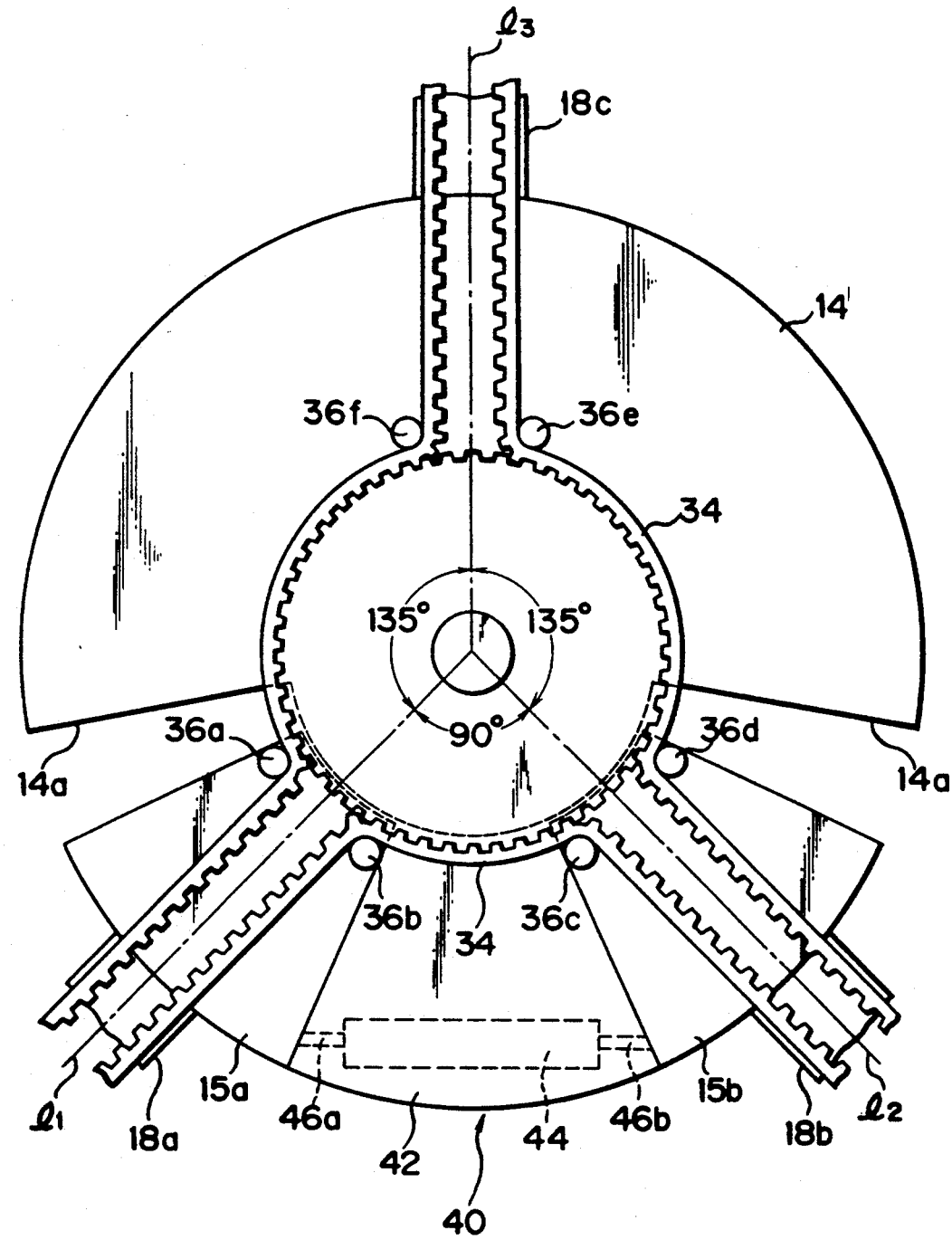
FIG. 8 is a plan view showing a state wherein the first and second arm members are separated from each other at a separation angle of 90 degrees.

The stopper member 42 is formed into a substantially fan-like shape having a central angle of 50 degrees with respect to the center of the pickup main body 14'. When the extending angle of the stopper member 42 is defined in this manner, the first and second slide blocks 15a and 15b can decrease their separation angle by 15 degrees each ($=(80-50)/2$), i.e., a total of 30 degrees within a range from the state illustrated in FIG. 7 until they are brought into contact with the stopper member 42. In other words, in the second embodiment, when the slide blocks 15a and 15b are swung from a state wherein their first and second extending axes $l_1$ and $l_2$ are separated from each other by 120 degrees, as shown in FIG. 7, to a state wherein they are moved toward each other to contact with the stopper member 42 from two sides, as shown in FIG. 8, an angle defined between the first and second extending axes $l_1$ and $l_2$ can be changed to 90 degrees ($=120-30$).

The above-mentioned cylinder mechanism 40 comprises a cylinder main body 44, and a pair of piston rods 46a and 46b which are projectable from the cylinder main body 44 in opposing directions. The distal ends of the first and second piston rods 46a and 46b are pivotally supported on opposing side surfaces of the first and second slide blocks 15a and 15b, respectively.

The cylinder main body 44 is connected to a pneumatic mechanism 50 through a selector valve 48, as shown in FIG. 7. The selector valve 48 is connected to a control unit 52, so that its connection state is controlled by the control unit 52.

More specifically, the selector valve 48 disconnects the cylinder main body 44 from the pneumatic mechanism 50 in response to a first control signal indicating a separation angle of 120 degrees, which is output from the control unit 52, so that pressure from the pneumatic mechanism 50 does not act on the cylinder main body 44. As a result, in the cylinder mechanism 40, the piston rods 46a and 46b are biased in outwardly projecting directions by a biasing force of a coil spring (not shown)

incorporated in the cylinder main body 44. More specifically, when the first control signal is output, the two slide blocks 15a and 15b are separated from each other, and are held to be in elastic contact with the two side surfaces of the recess portion 14a. In this manner, as shown in FIG. 7, the first and second slide blocks 15a and 15b, and hence, the first and second arm portions 18a and 18b, are separated from each other at an angle of 120 degrees.

The selector valve 48 connects the cylinder main body 44 and the pneumatic mechanism 50 in response to a second control signal for indicating a separation angle of 90 degrees, which is output from the control unit 52, so that a pressure from the pneumatic mechanism 50 acts on the cylinder main body 44. As a result, in the cylinder mechanism 40, the piston rods 46a and 46b are biased to be retracted inwardly against the biasing force of the coil spring (not shown) incorporated in the cylinder main body 44. More specifically, when the second control signal is output, the two slide blocks 15a and 15b approach each other, and are held to be in elastic contact with the stopper member 42 from two sides. In this manner, as shown in FIG. 8, the first and second slide blocks 15a and 15b, and hence, the first and second arm portions 18a and 18b, are separated from each other at an angle of 90 degrees.

In this manner, according to the pickup apparatus 10 of the second embodiment, even when a work W has a triangular shape or its surfaces contacting the finger members are not parallel surfaces but inclined surfaces, a pickup position according to the outer shape of the work W, i.e., optimal separation angles of the three finger members 22a, 22b, and 22c, can be selected, thus reliably picking up the work W.

Figure 9:
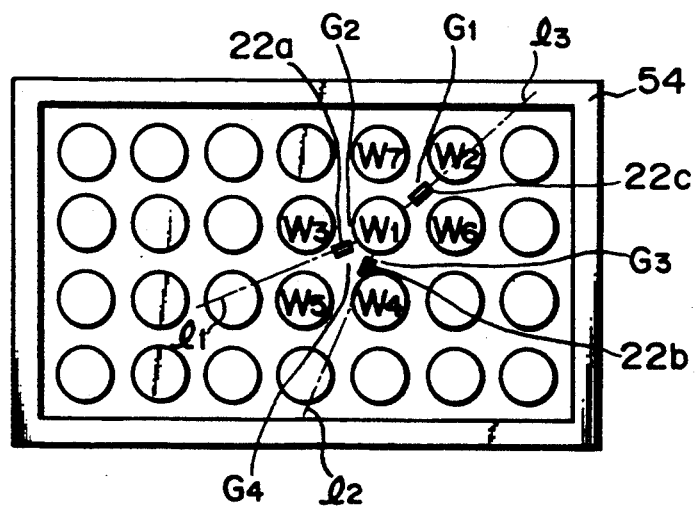
FIG. 9 is a schematic plan view showing a state wherein the pickup apparatus of the second embodiment picks up a work W in a pallet.

When a large number of cylindrical works W stored in a pallet 54, as shown in FIG. 9, are to be picked up, these works W are often stored in a lattice pattern in the pallet 54 to increase filling efficiency. In this storage state, a gap $G_1$ between a work $W_1$ to be picked up and an obliquely adjacent work, e.g., an obliquely right upward adjacent work $W_2$ in FIG. 9, has a sufficient margin. However, gaps $G_2$ and $G_3$ between the work $W_1$ and orthogonally adjacent works, e.g., left and downward adjacent works $W_3$ and $W_4$, are small.

As a result, when separation angles between moving paths $l_1$, $l_2$, and $l_3$ of the three finger members 22a, 22b, and 22c are set at equal angular intervals, e.g., 120 degrees, the third finger member 22c can be inserted in the relatively large gap $G_1$ but the first and second finger members 22a and 22b cannot be inserted in the small gaps $G_2$ and $G_3$, as has already been discussed with reference to the prior art problems.

In the second embodiment, however, the angle changing mechanism 25 is operated to be able to change a separation angle between the moving paths $l_1$ and $l_2$ of the first and second finger members 22a and 22b of the three finger members 22a, 22b, and 22c, in other words, an angle defined by the first and second finger members 22a and 22b and the central point of the pickup main body 14′, from 120 degrees to 90 degrees. In this manner, when the separation angle between the moving paths $l_1$ and $l_2$ between the first and second finger members 22a and 22b is changed to 90 degrees, the first and second finger members 22a and 22b are located in a relatively large gap $G_4$ formed between the work $W_1$ and an obliquely left downward adjacent work $W_5$. Thus, the first and second finger members 22a and 22b can be inserted in portions aside the work $W_1$. As a result, all the three finger members 22a, 22b, and 22c can be reliably inserted in portions (outer peripheral portions) aside the work $W_1$ to be picked up, and the work $W_1$ can be reliably picked up.

In the second embodiment, as shown in FIG. 6, the rotational amount of the driving motor 26 is always detected through a rotary encoder 26b connected thereto, and is output to the control unit 52 connected to the rotary encoder 26b. A proximity switch serving as an origin sensor 58 is attached to the outer end portion of the first arm portion 18a. The origin sensor 58 is turned on by the adjacent finger member 22a, and is connected to the control unit 52. An ON signal from the origin sensor 58 is output to the control unit 52. The control unit 52 can recognize original positions of the finger members 22a, 22b, and 22c on the basis of the ON signal from the origin sensor 58, and can recognize present positions (radial positions) of the finger members 22a, 22b, and 22c on the basis of the moving amounts of the finger members 22a, 22b, and 22c from the original positions, i.e., the rotational amount of the driving motor 26 detected by the rotary encoder 26b.

Figure 10:
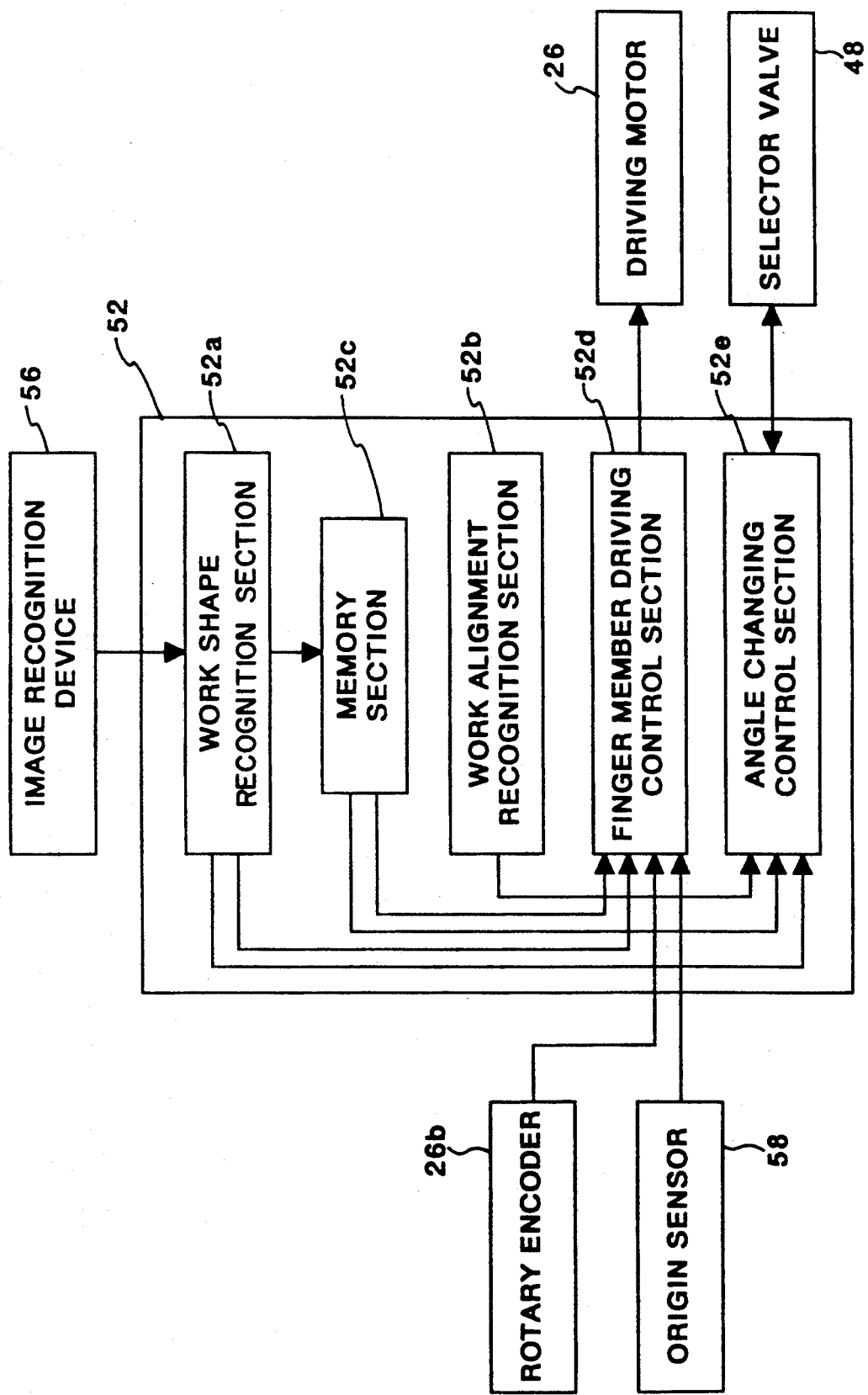
FIG. 10 is a block diagram showing an arrangement of a control unit.
Figure 11A:
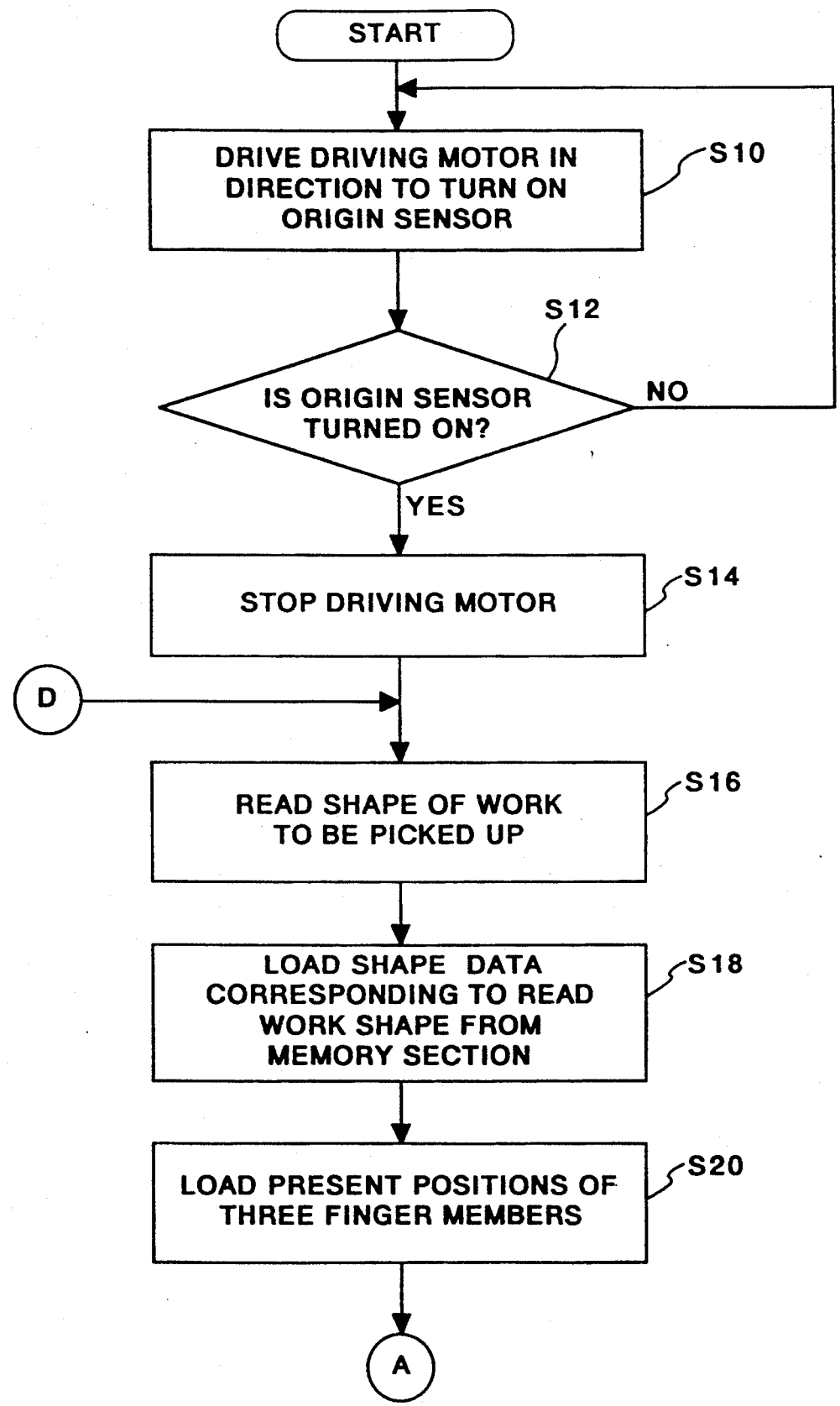
FIGS. 11 A to 11 D are flow charts showing a control sequence in the control unit.
Figure 11B:
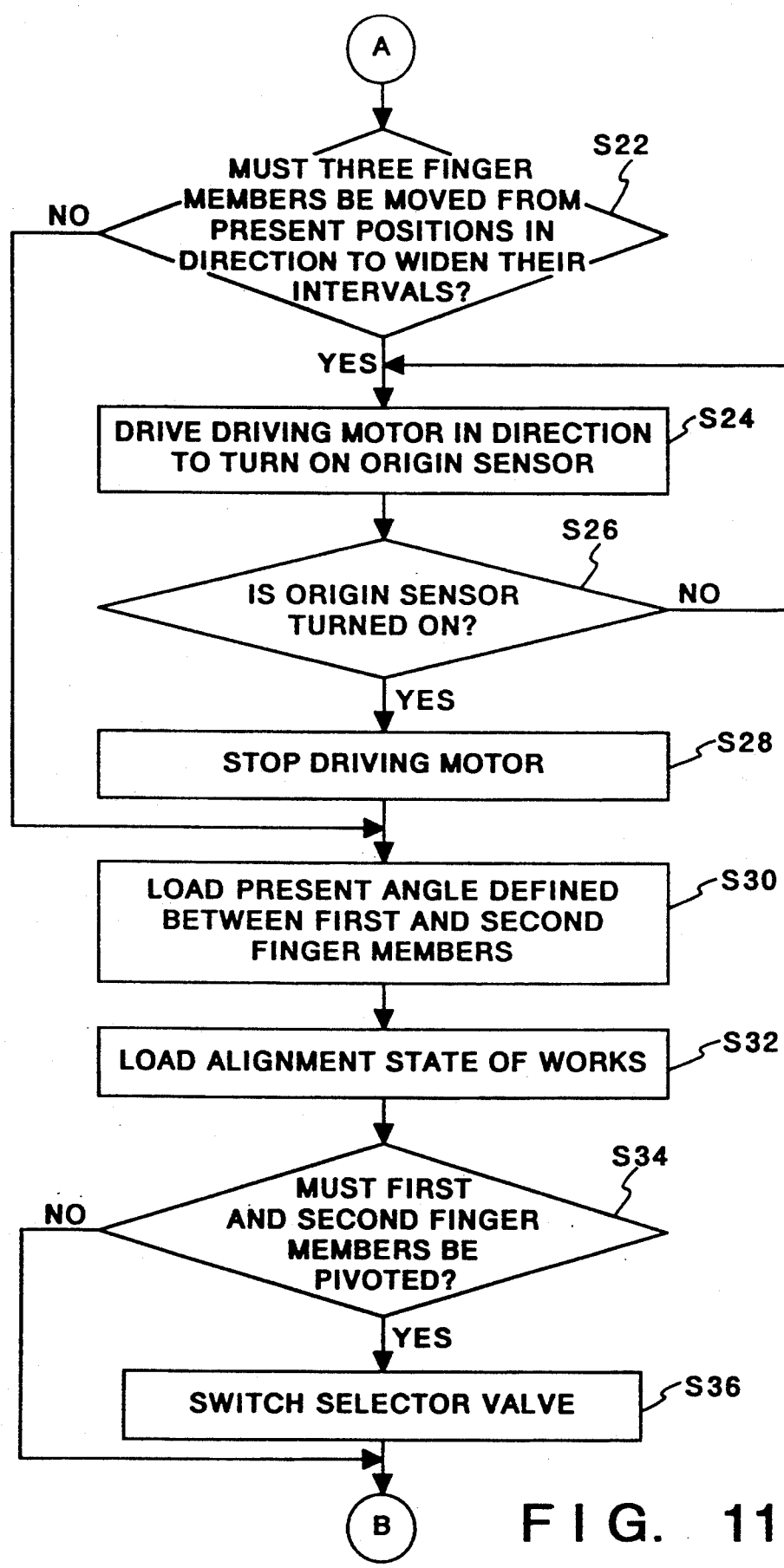
Figure 11C:
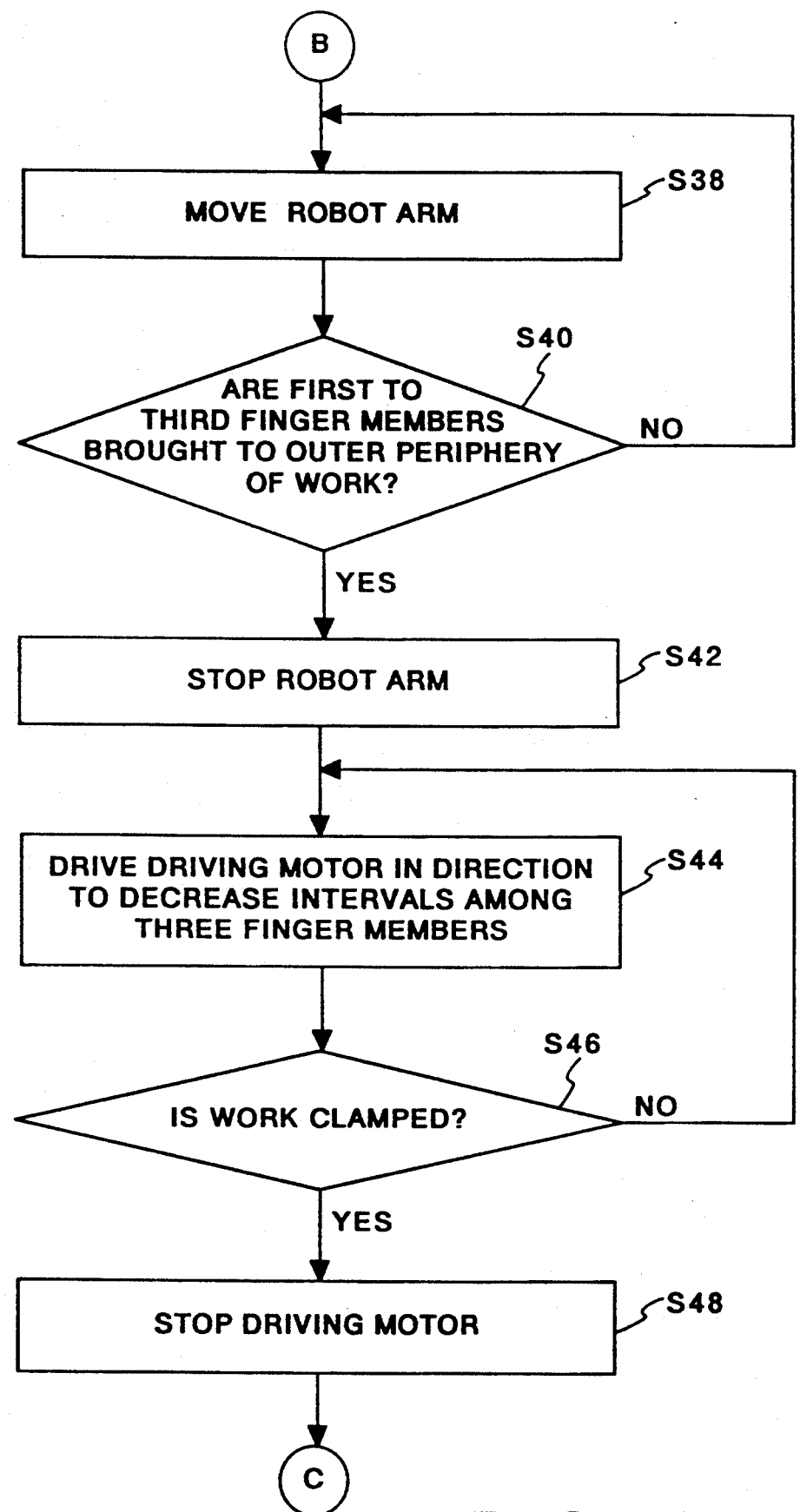
Figure 11D:
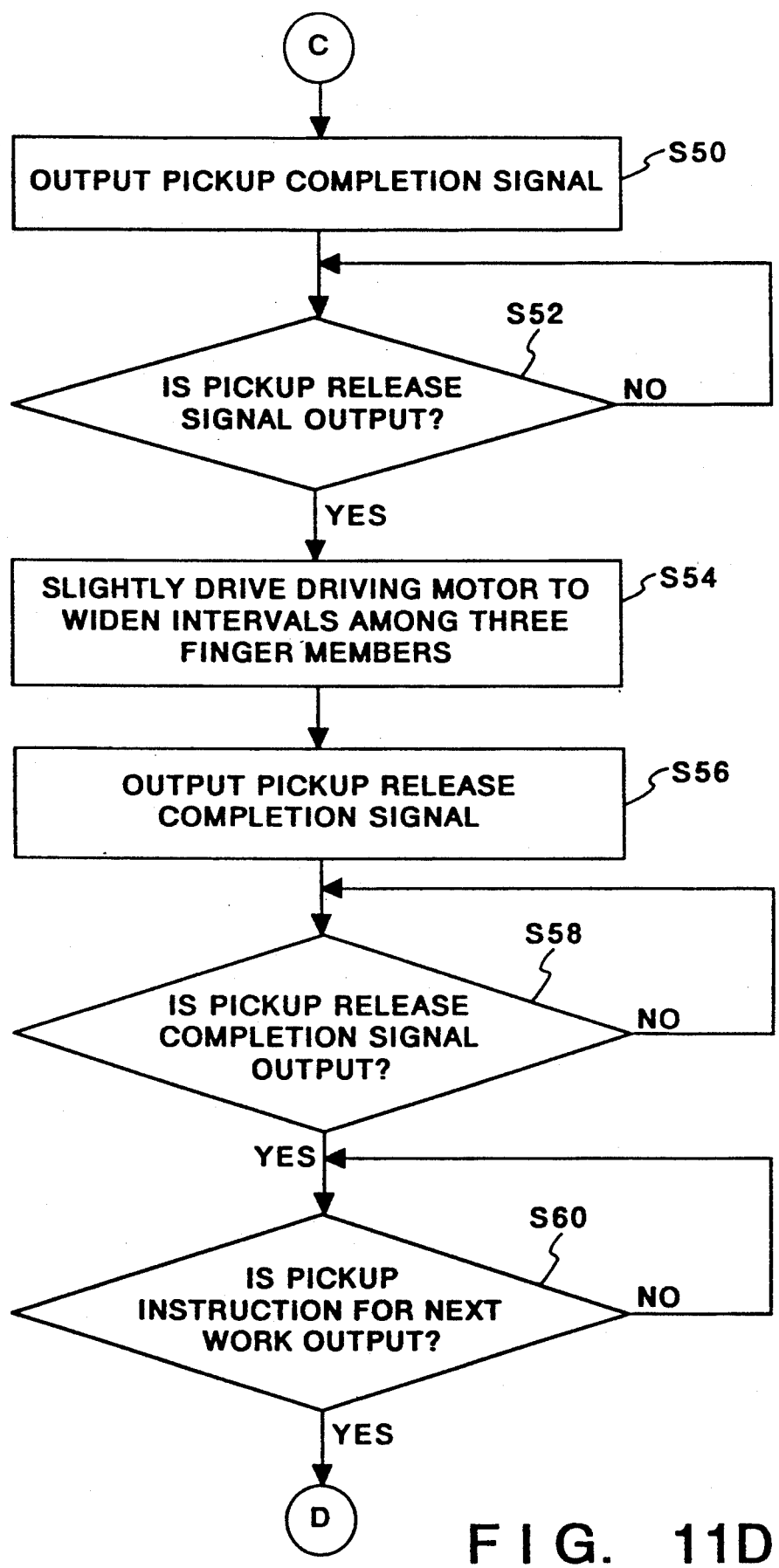

The arrangement of the control unit 52 will be briefly described below with reference to FIG. 10.

The control unit 52 comprises a work shape recognition section 52a for recognizing a work shape, and a work alignment recognition section 52b for recognizing an arrangement state of works W in the palette 54 such as alignment data of the works W, numeric data of the above-mentioned gaps $G_1$ to $G_5$, and the like. The work shape recognition section 52a is connected to an image recognition device 56 for photographing a work and recognizing an image on the basis of the photographing data, so that a work shape is recognized on the basis of image data from the image recognition device 56.

The control unit 52 also comprises a memory section 52c for storing shape data unique to works. The shape data includes data indicating outer dimensions of each work, and separation angle data of the first to third finger members 22a, 22b, and 22c necessary for attaining optimal pickup positions when a work is to be picked up.

The control unit 52 comprises a finger member driving control section 52d for controlling the driving motor 26 to change relative positions of the three finger members 22a, 22b, and 22c. The finger member driving control section 52d acquires shape data of a work to be picked up from the work shape recognition section 52a and the memory section 52c, and detects the present positions of the three finger members 22a, 22b, and 22c on the basis of detection signals from the rotary encoder 26b and the origin sensor 58.

The control unit 52 comprises an angle changing control section 52e for controlling the selector valve 48 to start the angle changing mechanism 25, thereby changing an angle defined between the first and second finger members 22a and 22b. The angle changing control section 52e acquires shape data of a work to be picked up from the work shape recognition section 52a and the memory section 52c, and recognizes arrangement data of the works W from the work alignment recognition section 52b.

The control sequence of the work pickup operation in the control unit 52 with the above arrangement will be described below with reference to FIGS. 11 A to 11 D.

In step S10, the driving motor 26 is driven in a direction to turn on the corresponding origin sensor 58. If it is determined in step S12 that the origin sensor 58 is turned on, the driving motor 26 is stopped in step S14. In this manner, the finger member driving control section 52d in the control unit 52 recognizes the original positions of the three finger members 22a, 22b, and 22c, and can recognize their present positions as absolute amounts from the corresponding original positions.

The sequence in steps S10 to S14 need only be executed once when a system is started, and need not be repetitively executed in the following work pickup operation.

Thereafter, in step S16, the work shape recognition section 52a is started to recognize the shape of a work to be picked up from image data from the image recognition device 56. In step S18, shape data of a corresponding work is loaded from the memory section 52c on the basis of the work shape recognized in step S16.

In step S20, the finger member driving control section 52d is started to read present positions of the three finger members 22a, 22b, and 22c. Thereafter, it is checked in step S22 based on the present positions of the three finger members 22a, 22b, and 22c read in step S20 and the shape data of the work to be picked up loaded in step S18 if the three finger members 22a, 22b, and 22c must be moved in directions to widen their intervals from their present positions when this work is to be picked up.

If YES in step S22, i.e., if it is determined that the present positions of the three finger members 22a, 22b, and 22c are located inwardly from the outer periphery of the work to be picked up and a pickup operation is impossible, the driving motor 26 is driven to move the three finger members 22a, 22b, and 22c from their present positions in a direction to turn on the origin sensor 58 in step S24. If it is determined in step S26 that the origin sensor 58 is turned on, the driving motor 26 is stopped in step S28. Subsequently, step S30 is executed.

On the other hand, if NO in step S22, i.e., if it is determined that the present positions of the three finger members 22a, 22b, and 22c are located outwardly from the outer periphery of the work to be picked up and a pickup operation is possible at the present positions, the flow skips steps S24 to S28, and step S30 is directly executed.

In step S30, the angle changing control section 52e is started to load a present pivot angle defined between the first and second finger members 22a and 22b set by the angle changing mechanism 25. In step S32, the arrangement state of the works W in the palette 54 is loaded, which state is recognized by the work alignment recognition section 52b. It is then checked in step S34 if the angle defined between the first and second finger members 22a and 22b loaded in step S30 must be changed from the present angle defined between the first and second finger members 22a and 22b in association with the alignment of the work to be picked up loaded in step S32 when this work is to be picked up.

If YES in step S34, i.e., if it is determined that the angle defined between the first and second finger members 22a and 22b must be changed from the present angle, the selector valve 48 is driven to pivot the first and second slide blocks 15a and 15b about the central axis of the pickup main body 14' in step S36. Subsequently, step S38 is executed.

However, if NO in step S34, i.e., if it is determined that the angle defined between the first and second finger members 22a and 22b need not be changed from the present angle, step S38 is directly executed while skipping step S36 described above.

In step S38, a robot arm is moved by a controller (not shown) of the robot so that the first to third finger members 22a, 22b, and 22c are located immediately on the outer periphery of the work W. If it is determined in step S40 that the first to third finger members 22a, 22b, and 22c are located immediately on the outer periphery of the work W, the operation of the robot hand is stopped in step S42. Thereafter, in step S44, the finger member driving control section 52d is started again to drive the driving motor 26 in a direction to decrease intervals between the three finger members 22a, 22b, and 22c. If it is determined in step S46 that the work is clamped by the three finger members 22a, 22b, and 22c, the driving motor 26 is stopped in step S48. Note that completion of a clamping operation in step S46 can be detected by, e.g., monitoring an energization current of the driving motor 26 or via a contact sensor.

Thereafter, in step S50, a pickup completion signal is output. In response to this pickup completion signal, the robot (not shown) conveys the pickup apparatus 10 which picks up the work to a predetermined placing position according to a control sequence of the robot controller. When the pickup apparatus 10 is conveyed to the predetermined placing position, the robot controller outputs a pickup release signal to the control unit 52.

More specifically, after step S50 is executed, the control unit 52 waits for output of the pickup release signal in step S52. If the control unit 52 detects the pickup release signal in step S52, it drives the driving motor 26 to slightly widen intervals between the three finger members 22a, 22b, and 22c in step S54. The control unit 52 outputs a pickup release completion signal in step S56. Upon reception of the pickup release completion signal, the robot controller returns the pickup apparatus 10 to an original work pickup position. When this return operation is completed, the controller outputs a return completion signal to the control unit 52.

More specifically, after step S56 is executed, the control unit 52 waits for output of the return completion signal in step S58. If the control unit 52 detects the return completion signal in step S58, it further waits for a pickup instruction of the next work in step S60. The flow then returns to step S16, and a control sequence in step S16 and subsequent steps is executed.

Since the control unit 52 executes the predetermined control sequence in this manner, one of a large number of works stored in the palette 54 at high filling efficiency can be reliably clamped and picked up.

The present invention is not limited to the arrangement of the second embodiment described above, and various other changes and modifications may be made within the spirit and scope of the invention.

For example, the toothed timing belt 34 is used to transmit a driving force of the driving motor 26. The present invention is not limited to this. For example, a chain, a flat belt, a wire, or a mesh belt may be employed. When a flat belt, a wire, or a mesh belt is adopted, it must be pressed against a driving pulley by regulation rollers at a predetermined pressure.

In the second embodiment described above, the angle changing mechanism 25 adopts the pneumatic cylinder mechanism 40, and an angle is changed by the angle changing mechanism 25 to two angles, i.e., 120 degrees and 90 degrees. However, this embodiment is not limited to this arrangement. For example, as shown in FIGS. 12A and 12B as a modification of the second embodiment, a motor-driven cylinder mechanism 41 may be adopted, and an angle may be changed to an arbitrary angle between 120 degrees and 90 degrees by the angle changing mechanism 25.

The arrangement of the angle changing mechanism 25 according to the modification of the second embodiment will be described below with reference to FIGS. 12A and 12B.

As shown in FIG. 12A, in the motor-driven cylinder mechanism 41 according to this modification, a driving motor 43 is incorporated in a cylinder main body 44'. One rod 46a' is fixed to the left end face (FIG. 12A) of the cylinder main body 44', and only the other rod 46b' is arranged to be projectable from the right end face (FIG. 12A) of the cylinder body 44. As can be seen from FIG. 12B, threaded grooves 45a and 45b which are threadably engaged with each other are formed on the outer peripheral surface of the proximal end portion of the other rod 46b', and the inner peripheral surface of the right end portion of the cylinder body 44'. An insertion groove 47 is formed in the proximal end portion of the other rod 46b' to pass through the central axis and extend along the axial direction. An engaging groove 49 is formed to communicate with the insertion groove 47, extend along the radial direction, and be open to the outer peripheral surface.

A motor shaft 43a of the driving motor 43 is inserted in the above-mentioned insertion groove 47, and a lock pin 51 to be fitted in the engaging groove 49 is attached to the distal end of the motor shaft 43a to extend along the radial direction.

Since the cylinder mechanism 41 is arranged in this manner, when the driving motor 43 rotates the motor shaft 43a, e.g., clockwise, the other rod 46b' projects outwardly via a threadable engagement state between the threaded grooves 45a and 45b; when the motor shaft 43a is driven counterclockwise, the other rod 46b' is retracted inwardly.

A rotary encoder 43b for detecting a rotational amount of the driving motor 43 is attached to the driving motor 43. The rotary encoder 43b is connected to the control unit 52. In this manner, the control unit 52 can accurately detect the rotational amount of the driving motor 43, i.e., a projecting/retracting amount of the other rod 46b' on the basis of a detection output from the rotary encoder 43b. The projecting/retracting amount of the other rod 46b' accurately corresponds to an angle defined between the first and second slide blocks 15a and 15b with respect to the center of the pickup main body 14', and the control unit 52 changes the projecting/retracting amount of the other rod 46a' to arbitrarily change this angle.

According to the angle changing mechanism 25 of this modification, an angle to be changed can be arbitrarily set between 120 degrees and 90 degrees, and 120 degrees as a maximum angle and 90 degrees as a minimum angle can be arbitrarily set.

In the second embodiment described above, the three finger members are arranged. However, the present invention is not limited to this arrangement, and the same arrangement may be adopted as long as the number of finger members is three or more.

An arrangement of a pickup apparatus 60 of the third embodiment which comprises four finger members will be described below with reference to FIGS. 13 to 15B.

In the following description, the same reference numerals denote the same parts as in the arrangement of the second embodiment, and a detailed description thereof will be omitted.

As shown in FIG. 13, the pickup apparatus 60 of the third embodiment comprises four, i.e., first to fourth arm portions 18a to 18d. In the third embodiment, a first angle changing mechanism 25a is interposed between the first and second arm portions 18a and 18b, and a second angle changing mechanism 25b is interposed between the third and fourth arm portions 18c and 18d. More specifically, a pair of recess portions 14a' and 14b' are formed in the outer periphery of a pickup main body 14' to be separated by 180 degrees. First and second slide blocks 15a' and 15b' are independently arranged in the first and second recess portions 14a' and 14b', respectively, to be swingable about the central axis of the pickup main body 14 along the circumferential direction.

The above-mentioned first and third arm portions 18a and 18c are respectively fixed on the upper ends of the central portions of the outer peripheral surfaces of the first and second slide blocks 15a' and 15b'. The second and fourth arm portions 18b and 18d are fixed on the upper end of the outer peripheral surface of the pickup main body 14 to extend in opposing directions along an axis perpendicular to a line segment connecting the central axes of the first and third arm portions 18a and 18c. The first and third arm portions are attached to the first and second slide blocks 15a' and 15b', respectively, which are displaced to be in contact with the clockwise side end faces of the first and second recess portions 14a' and 14b'.

In a state wherein the first slide block 15a' is displaced to be in contact with the counterclockwise side end face of the corresponding first recess portion 14a', the first arm portion 18a attached thereto and the second arm portion 18b define a central angle of 60 degrees. In a state wherein the second slide block 15b' is displaced to be in contact with the counterclockwise side end face of the corresponding second recess portion 14b', the third arm portion 18c attached thereto and the fourth arm portion 18d define a central angle of 60 degrees.

Recesses 62a and 62b for respectively storing first and second angle changing mechanisms 25a and 25b are formed in the counterclockwise side end faces of the first and second recess portions 14a' and 14b'. In these first and second recesses 62a and 62b, cylinder main bodies 44a and 44b of the first and second angle changing mechanisms 25a and 25b are pivotally mounted, respectively. Piston rods 46c and 46d projecting from these cylinder main bodies 44a and 44b project outwardly from the corresponding recesses 62a and 62b, and are pivotally mounted on the counterclockwise side end faces of the first and second slide blocks 15a' and 15b', respectively.

The cylinder main bodies 44a and 44b of the first and second angle changing mechanisms 25a and 25b are connected to a pneumatic mechanism 50 via selector valves 48a and 48b, respectively. These selector valves 48a and 48b are independently controlled by the control unit 52.

Since the pickup apparatus 60 according to the third embodiment is arranged as described above, angles formed between two adjacent ones of the four arm portions 18a to 18d are set to be 90 degrees, as shown in FIG. 13, in a state wherein the two selector valves 48a and 48b are controlled by the control unit 52 to be disconnected from the pneumatic mechanism 50. As a result, the four arm portions define a so-called cross-shape.

When the control unit 52 controls such that only the first selector valve 48a is connected to the pneumatic mechanism 50, an angle defined between the first and second arm portions 18a and 18b is set to be 60 degrees, and an angle defined between the second and third arm portions 18b and 18c and an angle defined between the third and fourth arm portions 18c and 18d are respectively set to be 90 degrees, as shown in FIG. 14A. Thus, an angle defined between the fourth and first arm portions 18d and 18a is set to be 120 degrees.

Figure 14B:
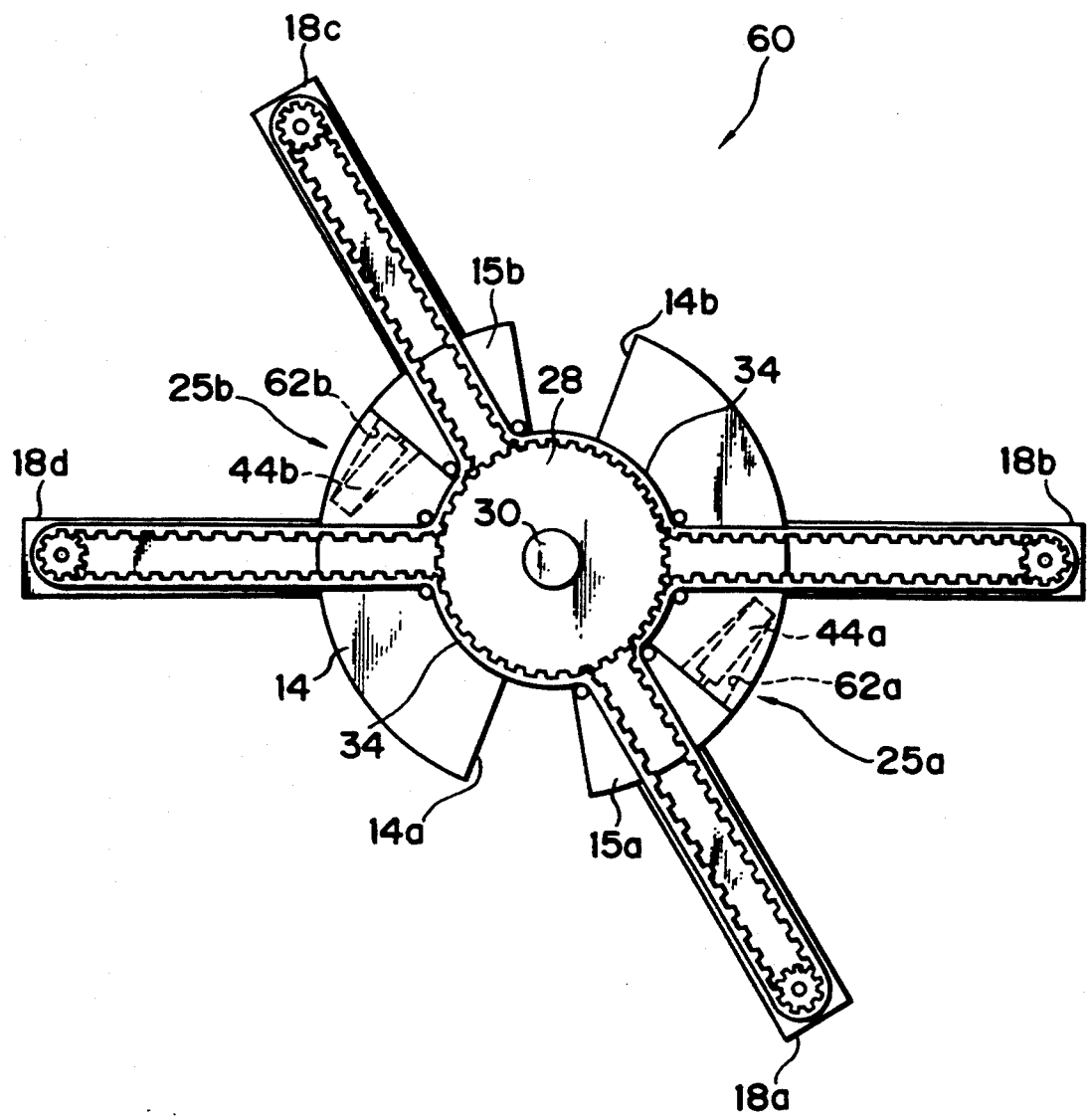

Furthermore, when the control unit 52 controls such that the two selector valves 48a and 48b are connected to the pneumatic mechanism 50, an angle defined between the first and second arm portions 18a and 18b, and an angle defined between the third and fourth arm portions 18c and 18d are respectively set to be 60 degrees, and an angle defined between the second and third arm portions 18b and 18c, and an angle defined between the fourth and first arm portions 18d and 18a are respectively set to be 120 degrees, as shown in FIG. 14B.

In this manner, in the pickup apparatus 60 of the third embodiment, angles defined between two adjacent ones of the four arm portions 18a to 18d, i.e., four finger members 22a to 22d, can be changed in three modes. As a result, pickup positions can be more finely set.

In particular, since the third embodiment employs the four finger members 22a to 22d, for example, when these four finger members 22a to 22d are set in a cross-shape, as shown in FIG. 13, a work W can be clamped by their four surfaces, as shown in FIG. 15A. As a result, the work W can be clamped while being aligned. More specifically, when a work W shown in FIG. 15A is clamped using the pickup apparatus 10 of the second embodiment comprising the three finger members 22a to 22c, only two surfaces of the work W can be clamped, as shown in FIG. 15B, although the work W can be reliably clamped. More specifically, the work W is set in a free state in a direction perpendicular to the direction clamped by the three finger members 22a to 22c, and its position in this direction cannot be defined.

More specifically, although this pickup apparatus can clamp the work W, it can align the work W in only one direction, and cannot align it in two orthogonal directions. In this manner, the pickup apparatus comprising the three finger members 22a to 22c cannot align the work W when it clamps the work W.

In each of the first to third embodiments described above, works W aligned in the palette 54 at high filling efficiency can be reliably clamped in such a manner that angles defined by adjacent finger members are adjusted to optimal values according to formation positions of surrounding gaps, so that the finger members can be inserted in these gaps. However, the present invention is not limited to this arrangement. As will be described below in the fourth embodiment, moving strokes of finger members may be appropriately changed.

An arrangement of a pickup apparatus 70 according to the fourth embodiment which comprises a stroke changing mechanism will be described below with reference to FIGS. 16 to 18.

Since the arrangement of parts located below the upper surface of the pickup main body 14' is the same as that in the second embodiment described above, a detailed description thereof will be omitted, and its illustration is also omitted from FIG. 16.

In the pickup apparatus 70 of the fourth embodiment, as shown in FIG. 16, a second spur gear 72 having a smaller diameter than that of a spur gear 28 is coaxially attached to the upper surface of the spur gear 28 to be rotated integrally with the spur gear 28. A timing belt 34' is looped between only a third driven gear 32c and the spur gear 28 without being meshed with first and second driven gears 32a and 32b.

The second spur gear 72 is formed to have a sufficient axial length such that two belts, i.e., second and third toothed timing belts 74 and 76, are looped on it to be aligned in the axial direction. The second toothed timing belt 74 is looped between the upper half portion of the second spur gear 72 and the first driven gear 32a, and the third toothed timing belt 76 is looped between the lower half portion of the second spur gear 72 and the second driven gear 32b.

The two spur gears 28 and 72 are toothed at the same pitches, and the three timing belts 34, 74, and 76 are toothed at the same pitches.

Since the pickup apparatus 70 of the fourth embodiment is arranged as described above, when the two spur gears 28 and 72 are integrally rotated by the driving motor 26, with respect to a unit rotation of the driving motor 26, first and second finger members 22a and 22b corresponding to the first and second driven gears 32a and 32b are moved in a short stroke $d_1$, while a third finger member 22c corresponding to the third driven gear 32c is moved in a long stroke $d_2$, as shown in FIG. 17.

As shown in FIG. 18, even if the third finger member 22c is inserted in a gap $G_1$ between a work $W_1$ to be picked up and its obliquely right upward adjacent work $W_2$, and the first and second finger members 22a and 22b are inserted in gaps $G_2$ and $G_3$ formed between the work $W_1$ and its left and downward adjacent works $W_3$ and $W_4$, respectively, almost no space is present between the first and second finger members 22a and 22b and the work $W_1$, although a relatively wide space is present between the third finger member 22c and the work $W_1$. As a result, as discussed with reference to the prior art problems, if the three finger members 22a, 22b, and 22c have the same moving strokes in a synchronous state, the three finger members 22a, 22b, and 22c clamp the work $W_1$ while displacing the work $W_1$ obliquely right upward and pushing its right and upward adjacent works $W_6$ and $W_7$. When the work $W_1$ cannot be moved, it cannot be clamped.

In the fourth embodiment, however, since the moving stroke $d_1$ of the first and second finger members 22a and 22b is short, and the moving stroke $d_2$ of the third finger member 22c is long, the work $W_1$ can be clamped by the three finger members 22a, 22b, and 22c while it is almost left in its placing position. Therefore, according to the pickup apparatus 70 of the fourth embodiment, even if the finger members 22a, 22b, and 22c are inserted in the outer periphery of the work $W_1$, or the work $W_1$ is inhibited from being laterally moved in the palette, the work $W_1$ can be reliably clamped without pushing adjacent works W to change their positions.

In the fourth embodiment, as shown in FIG. 16, since the first to third finger members 22a, 22b, and 22c are moved according to travels of the three timing belts 74, 76, and 34', the timing belts 74, 76, and 34' need not be meshed with the corresponding spur gears 72 and 28 at a predetermined winding angle. For this reason, the fourth embodiment does not require regulation rollers 36a to 36f as regulation means required in the second embodiment.

In the fourth embodiment, the first to third finger members 22a, 22b, and 22c are moved according to travels of the three timing belts 74, 76, and 34'. However, the present invention is not limited to this arrangement, but another arrangement may be employed, as will be described as the fifth embodiment below with reference to FIG. 19.

As a difference from the arrangement of the fourth embodiment, a pickup apparatus 80 of the fifth embodiment comprises a second toothed timing belt 82 which is looped to commonly couple the first and second driven gears 32a and 32b to the second spur gear 72. The timing belt 34' independently couples the spur gear 28 and the third driven gear 32c as in the fourth embodiment.

According to the arrangement of the fifth embodiment, the same effect as in the fourth embodiment can be obtained.

In the fifth embodiment, since the second timing belt 82 commonly couples the first and second driven gears 32a and 32b, regulation rollers 84a and 84b as regulation means are required to maintain a meshing state between the second timing belt 82 and the second spur gear 72 in a state wherein an angle defined between the first and second arm portions 18a and 18b is changed.

As many apparently widely different embodiments of the present invention can be made without departing from the spirit and scope thereof, it is to be understood that the invention is not limited to the specific embodiments thereof except as defined in the appended claims.

What is claimed is:

1. A work pickup apparatus, comprising:
a hand main body;
at least first, second and third arm members extending radially from said main body;
angle changing means for changing an angle defined between at least first and second adjacent arm members;
a finger member disposed on each of said arm members and being supported to move in a radial direction with respect to said main body to pick up a workpiece; and
driving means for driving said finger members to change their respective radial positions on said arm members, said driving means including a rotary member rotatably attached to said hand main body, driving force transmission means for transmitting a rotational force of said rotary member into a radial driving force for driving said finger members, with said rotary member including a driving gear having teeth formed on its outer periphery, wherein
said driving force transmission means includes idle gears rotatably attached to distal ends of said arm members, a toothed timing belt having teeth on an inner surface thereof which mesh with said idle gears and said driving gear, and regulating means for regulating a travel path of said toothed timing belt so it remains in meshed contact with said driving gear, and wherein
said finger members are coupled to said toothed timing belt and extend in the same direction from said respective arm members.

2. The apparatus according to claim 1, wherein said driving means moves all of said finger members in synchronization with each other.

3. A work pickup apparatus, comprising:
a hand main body;
at least first, second and third arm members extending radially from said hand main body;
angle changing means for changing an angle defined between at least first and second adjacent arm members;
a finger member disposed on each of said arm members and being supported to move in a radial direction with respect to said main body to pick up a workpiece; and
driving means for driving said finger members to change their respective radial positions on said arm members, said driving means including first and second rotary members coaxially fixed to each other and having two different radii, first driving force transmission means for transmitting a rotational force of said first rotary member into a radial moving force for driving said finger member on said first arm member, and second driving force transmission means for transmitting a rotational force of said second rotary member into a radial moving force for driving either one or both of said finger member on said second arm member and said finger member on said third arm member.

4. The apparatus according to claim 3, wherein said first rotary member comprises a first driving gear having teeth formed on an outer periphery thereof, and wherein
said first driving force transmission means includes a first idle gear rotatably mounted on a distal end of said first arm member, and a first toothed timing belt having teeth formed on an inner surface thereof which mesh simultaneously with said first idle gear and said first driving gear.

5. The apparatus according to claim 4, wherein said first driving force transmission means further includes first regulation means for regulating a travel path of said first toothed timing belt so its remains in meshed contact with said first driving gear.

6. The apparatus according to claim 3, wherein said second rotary member comprises a second driving gear having teeth formed on an outer periphery thereof, and wherein
said second driving force transmission means includes second and third idle gears rotatably mounted on distal ends of said second and third arm members, respectively, a second toothed timing belt having teeth formed on an inner surface thereof which mesh with said second and third idle gears and said second driving gear, and second regulation means for regulating a travel path of said second toothed timing belt so it remains in meshed contact with said second driving gear.

7. The apparatus according to claim 3, wherein said second rotary member comprises a second driving gear having teeth formed on an outer periphery thereof, and wherein
said second driving force transmission means includes second and third idle gears rotatably mounted on distal ends of said second and third arm members, respectively, and a second toothed timing belt having teeth formed on an inner surface thereof which mesh simultaneously with said second and third idle gears and said second driving gear.

8. A work pickup apparatus, comprising:
a hand main body;
at least first, second and third arm members extending radially from said hand main body;

angle changing means for changing an angle defined between at least first and second adjacent arm members;

a finger member disposed on each of said arm members and being supported to move in a radial direction with respect to said main body to pick up a workpiece; and driving means for driving said finger members to change their respective radial positions on said arm members, wherein said angle changing means includes support means for supporting said first and second arm members to be swingable along a circumferential direction of said hand main body, increasing/decreasing means, arranged between said first and second arm members, for increasing/decreasing a separation distance between said first and second arm members, and a stopper member extending radially from said hand main body between said first and second arm members, wherein when said first and second arm members are brought into contact with said stopper member, a stop angle is defined therebetween, and wherein said increasing/decreasing means includes a driving cylinder, and a pair of piston rods projectable in opposing directions from said driving cylinder, with said piston rods being coupled at respective opposing distal ends to said first and second arm members.

9. A workpiece apparatus, comprising:
a hand main body;
at least first, second and third arm members extending radially from said hand main body,
angle changing means for changing an angle defined between at least first and second adjacent arm members;

a finger member attached to each of said arm members for picking up a workpiece, with each finger member being supported to move in a radial direction with respect to said hand main body; and driving means for driving said finger members to change their respective radial positions, said driving means including a motor, a rotary member which is rotatable around an axial center of said hand main body and rotated by said motor, and a transmission member coupled to each finger member for transmitting a rotating force of said rotary member into a radial moving force for driving said finger members, thereby moving each finger member in the radial direction so as to reduce or enlarge a distance of said finger members from said hand main body.

10. The apparatus according to claim 9, wherein said angle changing means includes first and second sliding members supported to move circumferentially around the axial center of said hand main body, said first and second sliding members supporting said first and second arm members, respectively, and moving means for moving said first and second sliding members circumferentially around said hand main body, wherein an angle between said first and second arm members is changed upon actuation of said moving means.

11. The apparatus according to claim 9, further comprising:

reading means for reading a shape of the workpiece to be picked up; and controlling means for controlling said driving means so as to drive said arm members to their optimum positions for picking up the workpiece in accordance with the result read by said reading means.

* * * * *

UNITED STATES PATENT AND TRADEMARK OFFICE
CERTIFICATE OF CORRECTION

PATENT NO. : 5,150,937
DATED : September 29, 1992
INVENTOR(S) : Takeshi Yakou

It is certified that error appears in the above-identified patent and that said Letters Patent is hereby corrected as shown below:

On the title page:
[56] REFERENCES CITED:

FOREIGN PATENT DOCUMENTS, "63136846  9/1968  Japan" should read --63-136846  9/1988  Japan--.

COLUMN 13:

Line 50, "rod 46a'" should read --rod 46b'--.

COLUMN 14:

Line 10, "14'" should read --14''--.

Signed and Sealed this

Eleventh Day of January, 1994

Attest:

BRUCE LEHMAN

Attesting Officer

Commissioner of Patents and Trademarks